US012795715B2

(12) United States Patent
Baek et al.

(10) Patent No.: US 12,795,715 B2
(45) Date of Patent: Nov. 10, 2026

(54) PRIORITIZATION METHOD AND DEVICE FOR PLURALITY OF COLLISION RESOURCES

(71) Applicant: SAMSUNG ELECTRONICS CO., LTD., Suwon-si (KR)

(72) Inventors: Sangkyu Baek, Suwon-si (KR); Sungjin Park, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 17/904,204

(22) PCT Filed: Feb. 9, 2021

(86) PCT No.: PCT/KR2021/001713
§ 371 (c)(1),
(2) Date: Feb. 6, 2023

(87) PCT Pub. No.: WO2021/162412
PCT Pub. Date: Aug. 19, 2021

(65) Prior Publication Data

US 2023/0189323 A1 Jun. 15, 2023

(30) Foreign Application Priority Data

Feb. 12, 2020 (KR) ........................ 10-2020-0017007
Feb. 13, 2020 (KR) ........................ 10-2020-0017867
Mar. 2, 2020 (KR) ........................ 10-2020-0025958

(51) Int. Cl.
*H04W 72/00* (2023.01)
*H04W 72/0446* (2023.01)
(Continued)

(52) U.S. Cl.
CPC ..... *H04W 72/563* (2023.01); *H04W 72/0446* (2013.01); *H04W 72/1268* (2013.01)

(58) Field of Classification Search
None
See application file for complete search history.

(56) References Cited

U.S. PATENT DOCUMENTS 11,082,952 B2 8/2021 Bae et al.
12,279,279 B2 * 4/2025 Loehr ................... H04L 5/0048
(Continued)

FOREIGN PATENT DOCUMENTS

CN 108513735 A 9/2018
CN 110249671 A 9/2019
KR 10-2020-0050308 A 5/2020

OTHER PUBLICATIONS

European Patent Office, "Extended European Search Report," dated May 11, 2023, in connection with European Patent Application No. 21753238.1, 9 pages.
(Continued)

*Primary Examiner* — Brandon M Renner

(57) ABSTRACT

Provided is an operating method of a user equipment (UE) in a wireless communication system, the operating method including determining, by a medium access control (MAC) entity, a resource corresponding to an uplink radio resource or a scheduling request (SR) transmission resource, identifying, by the MAC entity, at least one uplink radio resource or at least one SR transmission resource other than a deprioritized resource, which overlaps with the resource on a time axis, and identifying, by the MAC entity, a prioritized resource for transmitting at least one of data, control information, or an SR, based on the priority of the at least one uplink radio resource other than the deprioritized resource, the priority of the at least one SR transmission resource other
(Continued)

than the deprioritized resource, and a priority of the resource.

10 Claims, 10 Drawing Sheets

(51) Int. Cl.
*H04W 72/1268* (2023.01)
*H04W 72/563* (2023.01)

(56) References Cited

U.S. PATENT DOCUMENTS

| | | | | |
|---|---|---|---|---|
| 2018/0176937 | A1 | 6/2018 | Chen et al. | |
| 2018/0368173 | A1 | 12/2018 | Shaheen et al. | |
| 2019/0014592 | A1 | 1/2019 | Hampel et al. | |
| 2019/0261161 | A1 | 8/2019 | Cardoso | |
| 2019/0261361 | A1 | 8/2019 | Xiong et al. | |
| 2019/0306922 | A1 | 10/2019 | Xiong et al. | |
| 2020/0178263 | A1* | 6/2020 | Shao | H04L 5/0055 |
| 2021/0014880 | A1 | 1/2021 | Jiang et al. | |
| 2021/0266953 | A1* | 8/2021 | Pelletier | H04W 72/1268 |
| 2022/0030409 | A1 | 1/2022 | Kim et al. | |
| 2022/0061071 | A1* | 2/2022 | Zhou | H04W 72/21 |
| 2023/0021043 | A1* | 1/2023 | Alabbasi | H04W 72/569 |
| 2023/0048889 | A1* | 2/2023 | Yue | H04W 76/28 |
| 2023/0058734 | A1* | 2/2023 | Xiao | H04L 1/1822 |
| 2023/0199754 | A1* | 6/2023 | Lee | H04L 1/1812 370/329 |

OTHER PUBLICATIONS

Qualcomm Incorporated, "Intra-UE prioritization framework and RANI impacts," 3GPP TSG-RAN WG2 Meeting #107, R2-1910736, Aug. 2019, 14 pages.
NTT DOCOMO, Inc., "Report for email discussion [106#53][IIOT] Handling of overlapping PUSCH grant prioritization," 3GPP TSG-RAN2 Meeting #107, R2-1911472, Aug. 2019, 47 pages.
CATT, "Data/data prioritization," 3GPP TSG-RAN WG2 Meeting #107bis, R2-1912211, Oct. 2019, 5 pages.
International Search Report and Written Opinion of the International Searching Authority dated May 13, 2021, in connection with International Application No. PCT/KR2021/001713, 8 pages.
Samsung, "TP for LCH-priority based Data-Data and SR-Data prioritization", R2-1916526, 3GPP TSG-RAN2 Meeting #108, Reno, USA, Nov. 18-22, 2019, 15 pages.
Samsung, "Priority Value of an Uplink Grant", R2-1915342, 3GPP TSG-RAN2 Meeting #108, Reno, USA, Nov. 18-22, 2019, 5 pages.
Ericsson, "Intra-UE control-data prioritization—SR over Pusch", R2-1912557, 3GPP TSG-RAN WG2 # 107bis, Chongqing, China, Oct. 14-18, 2019, 5 pages.
The First Office Action dated Mar. 27, 2025, in connection to Chinese Application No. 202180014418.6, 15 pages.
Communication under Rule 71(3) EPC dated May 26, 2025, in connection to European Application No. 21753238.1, 9 pages.
Office Action dated May 21, 2025, in connection to Korean Application No. 10-2020-0025958, 6 pages.
Nokia, et al., "Intra-UE prioritization for Collision Between Uplink Grants", 3GPP TSG-RAN WG2 Meeting #105bis, R2-1904072, 3 pages.
Nokia, et al., "Analysis of Intra-UE Data Prioritization Schemes", 3GPP TSG-RAN WG2 Meeting #106. R2-1906187, 5 pages.
Vivo, "Remaining issue for the priority of PUSCH and SR", 3GPP TSG-RAN WG2 Meeting #107bis, R2-1912322, 5 pages.
Notification of the Decision to Grant a Patent Right for Patent for Invention dated Aug. 12, 2025, in connection with Chinese Application No. 202180014418.6, 8 pages.
ZTE, "Conflicts among multiple configured grant PUSCH", 3GPP TSG RAN WG1#97, R1-1906418, May 2019, 2 pages.
Examination Report dated Jan. 19, 2026, in connection with Indian Application No. 202217049961, 7 pages.
Hearing Notice dated Aug. 10, 2026, in connection with Indian Application No. 202217049961, 2 pages.

* cited by examiner

PRIORITIZATION METHOD AND DEVICE FOR PLURALITY OF COLLISION RESOURCES

CROSS-REFERENCE TO RELATED APPLICATIONS

This application is a 371 of International Application No. PCT/KR2021/001713, filed February 9, 2021, which claims priority to Korean Patent Application No. 10-2020-0017007 filed on Feb. 12, 2020, Korean Patent Application No. 10-2020-0017867 filed on Feb. 13, 2020, and Korean Patent Application No. 10-2020-0025958 filed on Mar. 2, 2020, the disclosures of which are herein incorporated by reference in their entirety.

BACKGROUND

1. Field

The disclosure relates to a prioritization method and apparatus for a plurality of colliding resources in a wireless communication system.

2. Description of Related Art

To meet increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss and increase coverage of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and received-interference cancellation have been developed. In addition, for 5G systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks, machine-to-machine (M2M) communication, and machine-type communication (MTC) for connecting objects have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC communication are being implemented by using 5G communication technology including beamforming, MIMO, and array antennas. Application of a cloud RAN as the above-described big data processing technology may be an example of convergence of 5G communication technology and IoT technology.

Because a variety of services are providable due to the development of wireless communication systems as described above, a method for seamlessly providing services through prioritization of a plurality of colliding resources in a wireless communication system is required.

SUMMARY

The disclosure provides an apparatus and method capable of effectively supporting services in a wireless communication system.

According to an embodiment of the disclosure, a transmission method based on priorities of a plurality of uplink radio resources may include allocating at least one of a plurality of uplink radio resources and scheduling request (SR) configuration resources, determining priorities of the plurality of allocated uplink radio resources and SR configuration resources, and transmitting at least one of data or control information by using at least one of the plurality of allocated uplink radio resources and SR configuration resources based on the determination result.

DETAILED DESCRIPTION

Figure 1:
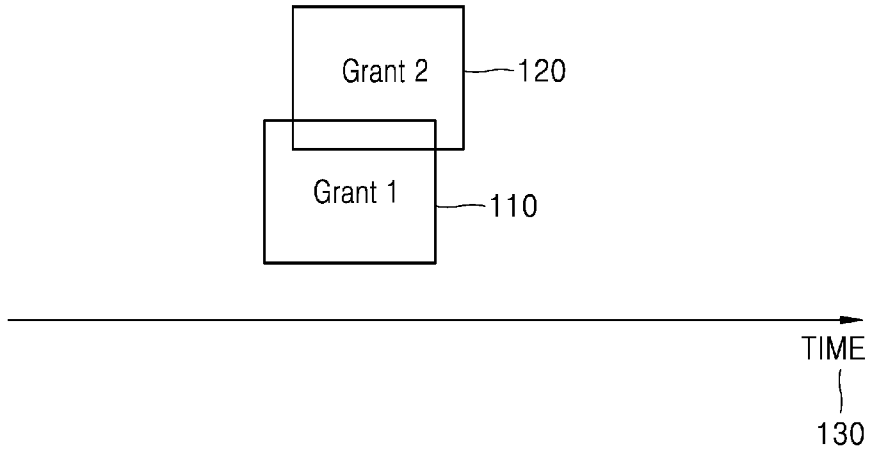
FIG. 1 is a diagram showing a scenario in which a plurality of uplink radio resources overlap, according to an embodiment of the disclosure.

According to an embodiment of the disclosure, an operating method of a user equipment (UE) in a wireless communication system may be provided. The operating method may include determining, by a medium access control (MAC) entity, a resource corresponding to an uplink radio resource or a scheduling request (SR) transmission resource, identifying, by the MAC entity, at least one uplink radio resource or at least one SR transmission resource other than a deprioritized resource, which overlaps with the resource on a time axis, identifying, by the MAC entity, a priority of the at least one uplink radio resource other than the deprioritized resource and a priority of the at least one SR transmission resource other than the deprioritized resource, identifying, by the MAC entity, a prioritized resource for transmitting at least one of data, control information, or an SR, based on the priority of the at least one uplink radio resource other than the deprioritized resource, the priority of the at least one SR transmission resource other than the deprioritized resource, and a priority of the resource, and determining, as deprioritized resources by the MAC entity, at least one uplink radio resource overlapping with the prioritized resource and at least one SR transmission resource overlapping with the prioritized resource.

The identifying of the prioritized resource for transmitting at least one of the data, the control information, or the SR may include determining, by the MAC entity, a type of an uplink grant having allocated an uplink radio resource related to data to be transmitted, and identifying, by the MAC entity, the prioritized resource based on the type of the uplink grant, and wherein the type of the uplink grant is a dynamic uplink grant or a configured uplink grant.

The identifying of the prioritized resource based on the type of the uplink grant may include, when the uplink radio resource is allocated by the dynamic uplink grant, determining, by the MAC entity, whether the priority of the resource is higher than the priority of the at least one uplink radio resource other than the deprioritized resource and the priority of the at least one SR transmission resource other than the deprioritized resource, which are allocated by the configured uplink grant, and identifying, by the MAC entity, the resource as the prioritized resource upon determining that the priority of the resource is higher.

The identifying of the prioritized resource based on the type of the uplink grant may include, when the uplink radio resource is allocated by the configured uplink grant, identifying the resource as the prioritized resource upon determining that the at least one uplink radio resource other than the deprioritized resource, which has a priority higher than the priority of the resource and is allocated by the configured uplink grant, does not exist, that the at least one uplink radio resource other than the deprioritized resource, which has a priority equal to or higher than the priority of the resource and is allocated by the dynamic uplink grant, does not exist, and that the at least one SR transmission resource other than the deprioritized resource, which has a priority higher than the priority of the resource, does not exist.

The identifying of the priority of the at least one uplink radio resource other than the deprioritized resource and the priority of the at least one SR transmission resource other than the deprioritized resource may include determining, by the MAC entity, the priority of the at least one SR transmission resource other than the deprioritized resource based on a priority of a logical channel having triggered an SR transmission.

The operating method may further include determining, by the MAC entity, the priority of the resource based on a highest priority from among priorities of logical channels included in a generated MAC protocol data unit (PDU), or a highest priority from among priorities of logical channels included in a MAC PDU to be generated.

The determining, by the MAC entity, of the resource corresponding to the uplink radio resource or the SR transmission resource may include identifying a priority of at least one uplink radio resource and a priority of at least one SR transmission resource, and determining the resource based on the priority of the at least one uplink radio resource and the priority of the at least one SR transmission resource.

The resource may be determined as an uplink radio resource or SR transmission resource corresponding to a highest priority from among the priority of the at least one uplink radio resource and the priority of the at least one SR transmission resource.

The identifying of the prioritized resource for transmitting at least one of the data, the control information, or the SR may include identifying, as the prioritized resource, an uplink radio resource or SR transmission resource corresponding to a highest priority from among the priority of the at least one uplink radio resource other than the deprioritized resource, the priority of the at least one SR transmission resource other than the deprioritized resource, and the priority of the resource.

According to an embodiment of the disclosure, a user equipment (UE) operating in a wireless communication system may be provided. The UE may include a transceiver, and at least one processor operating in association with the transceiver, wherein the at least one processor is configured to determine, by a medium access control (MAC) entity, a resource corresponding to an uplink radio resource or a scheduling request (SR) transmission resource, identify, by the MAC entity, at least one uplink radio resource or at least one SR transmission resource other than a deprioritized resource, which overlaps with the resource on a time axis, identify, by the MAC entity, a priority of the at least one uplink radio resource other than the deprioritized resource and a priority of the at least one SR transmission resource other than the deprioritized resource, identify, by the MAC entity, a prioritized resource for transmitting at least one of data, control information, or an SR, based on the priority of the at least one uplink radio resource other than the deprioritized resource, the priority of the at least one SR transmission resource other than the deprioritized resource, and a priority of the resource, and determine, as deprioritized resources by the MAC entity, at least one uplink radio resource overlapping with the prioritized resource and at least one SR transmission resource overlapping with the prioritized resource.

The at least one processor may be further configured to determine, by the MAC entity, a type of an uplink grant having allocated an uplink radio resource related to data to be transmitted, and identify, by the MAC entity, the prioritized resource based on the type of the uplink grant, and wherein the type of the uplink grant is a dynamic uplink grant or a configured uplink grant.

The at least one processor may be further configured to, when the uplink radio resource is allocated by the dynamic uplink grant, determine, by the MAC entity, whether the priority of the resource is higher than the priority of the at least one uplink radio resource other than the deprioritized resource and the priority of the at least one SR transmission resource other than the deprioritized resource, which are allocated by the configured uplink grant, and identify, by the MAC entity, the resource as the prioritized resource upon determining that the priority of the resource is higher.

The at least one processor may be further configured to, when the uplink radio resource is allocated by the configured uplink grant, identify the resource as the prioritized resource upon determining that the at least one uplink radio resource other than the deprioritized resource, which has a priority higher than the priority of the resource and is allocated by the configured uplink grant, does not exist, that the at least one uplink radio resource other than the deprioritized resource, which has a priority equal to or higher than the priority of the resource and is allocated by the dynamic uplink grant, does not exist, and that the at least one SR transmission resource other than the deprioritized resource, which has a priority higher than the priority of the resource, does not exist.

The at least one processor may be further configured to determine, by the MAC entity, the priority of the at least one SR transmission resource other than the deprioritized resource based on a priority of a logical channel having triggered an SR transmission.

The at least one processor may be further configured to determine, by the MAC entity, the priority of the resource based on a highest priority from among priorities of logical channels included in a generated MAC protocol data unit (PDU), or a highest priority from among priorities of logical channels included in a MAC PDU to be generated.

In the following description of the disclosure, a detailed description of known functions or configurations incorporated herein will be omitted when it may make the subject matter of the disclosure unclear. The terms used below are defined considering functions in the disclosure, and may be changed according to the customs or the intents of users or operators. Accordingly, definitions of the terms are understood on the basis of the entire description of this specification. In the following description, terms identifying access nodes, terms indicating network entities, terms indicating messages, terms indicating interfaces between network entities, terms indicating various types of identification information, etc. are merely selected for convenience of explanation. Therefore, the disclosure is not limited to these terms and other terms having technically equivalent meanings may also be used.

As used herein, a base station is an entity for allocating resources to terminals and may include at least one of a gNode B (gNB), an eNode B (eNB), a Node B (NB), a base station (BS), a radio access unit, a base station controller, or a node on a network. A terminal may include a user equipment (UE), a mobile station (MS), a cellular phone, a smartphone, a computer, or a multimedia system capable of performing communication functions. The term "terminal" may also indicate a mobile phone, NB-IoT devices, sensors, and other wireless communication devices. However, the base station and the terminal are not limited to the above examples.

To facilitate explanation, the disclosure uses terms and names defined in the 3rd Generation Partnership Project (3GPP) long term evolution (LTE) standards and/or the 3GPP new radio (NR) standards. However, the disclosure is not limited to these terms and names.

Although LTE, LTE-advanced (LTE-A), LTE Pro, or 5G (or NR) systems are mentioned as examples below, the embodiments of the disclosure may also be applied to other communication systems having similar technical backgrounds or channel types. Furthermore, the embodiments of the disclosure may also be applied to the other communication systems through partial modification without significantly departing from the scope of the disclosure based on determination by one of ordinary skill in the art. Hereinafter, the disclosure will be described in detail by explaining embodiments of the disclosure with reference to the attached drawings.

FIG. 1 is a diagram showing a scenario in which a plurality of uplink radio resources overlap. A base station may allocate, to a user equipment (UE), resources 110 and 120 for transmitting at least one of data or control information, and the resources 110 and 120 allocated to the UE may overlap on a time axis 130 or on the time axis 130 and a frequency axis. Each resource 110 or 120 allocated to the UE may be one of a dynamic grant (DG) for allocated from every physical downlink control channel (PDCCH), or a configured grant (CG) repeated at regular intervals once it is configured.

The configured grant may be activated immediately after being configured, or by an activation command. The configured grant may have a fixed traffic pattern or be assumed to be used for high-priority data. According to an embodiment, a specific uplink resource may be allocated dedicatedly for data having a short delay requirement. To this end, the base station may configure, through a radio resource control (RRC) configuration message for the UE, whether a specific uplink resource is usable for a specific logical channel.

When the uplink resources 110 and 120 overlap on the time axis 130 or on the time axis 130 and the frequency axis as shown in FIG. 1, the UE may need to select one radio resource for transmission. The resource selected and used for transmission may be a resource indicating a high priority value of a logical channel having data to be transmitted. To this end, the UE (e.g., a medium access control (MAC) entity of the UE) may determine a priority value of each uplink radio resource. When a MAC protocol data unit (PDU) to be transmitted using an uplink radio resource is already generated, a priority of the uplink radio resource may be determined as a highest priority from among priorities of data (or data and MAC control elements (CEs)) included in the generated MAC PDU.

When the MAC PDU to be transmitted using the uplink radio resource is not generated, the priority of the uplink radio resource may be determined as a highest priority from among priorities of logical channels which may be multiplexed in the uplink radio resource. Therefore, the priority of the uplink radio resource may be determined as a highest priority from among priorities of logical channels (or logical channels and MAC CEs) having data (or data and MAC CEs) to be sent, from among logical channels (or logical channels and MAC CEs) which may use the uplink radio resource.

When an uplink radio resource is allocated but is actually unusable, the radio resource should not be selected for transmission. For example, when the allocated uplink radio resource is a configured grant resource but a configured grant timer for a hybrid automatic repeat request (HARQ) process of the configured grant resource is running, the UE may not transmit certain data or control information on the allocated configured grant resource.

As another example, when a certain uplink radio resource is allocated with a configured scheduling radio network temporary identifier (CS-RNTI) and is a retransmission resource for a configured grant with a new data indicator (NDI) which is not toggled, a radio resource allocated when a HARQ buffer of the HARQ process is empty may not be used for transmission.

As another example, although the allocated uplink radio resource is a part of resources of a bundle and is not an initial transmission resource of the bundle, a radio resource allocated when the HARQ buffer of the HARQ process is empty may not be used for transmission. The unusable radio resource may be excluded when priorities of colliding resources are determined, or the UE (e.g., the MAC entity of the UE) may set a priority value of the resource as a specific low value to prevent use for transmission. According to an embodiment, the UE or the base station may set the priority value of the unusable radio resource as a lowest value to prevent use for transmission.

Figure 2:
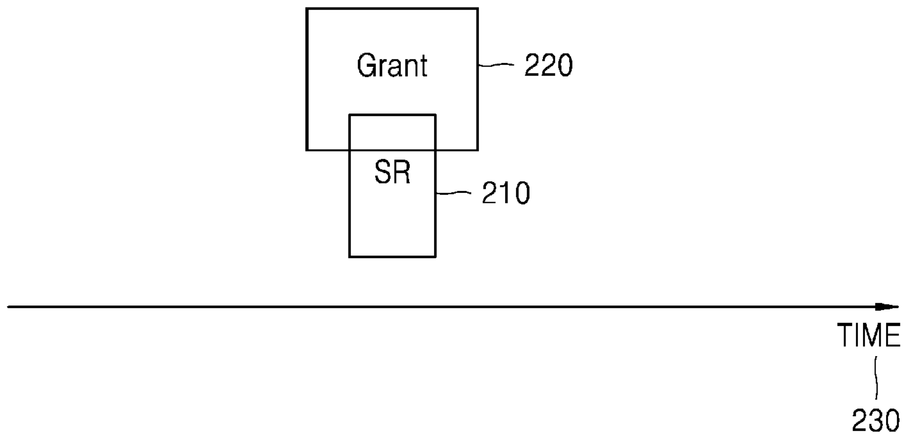
FIG. 2 is a diagram showing a scenario in which a scheduling request (SR) and an uplink radio resource overlap, according to an embodiment of the disclosure.

FIG. 2 is a diagram showing a scenario in which a scheduling request (SR) and an uplink radio resource overlap, according to an embodiment of the disclosure. A base station may allocate, to a UE, an SR configuration resource 210 capable of transmitting an SR message. The base station may also allocate, to the UE, a resource 220 for transmitting at least one of data or control information. The resource 220 allocated to the UE may be one of dynamic grant (DG) allocated from every physical downlink control channel (PDCCH), or configured grant (CG) repeated at regular intervals once it is configured.

The configured grant may be activated immediately after being configured, or by an activation command. The configured grant may have a fixed traffic pattern or be assumed to be used for high-priority data. According to an embodiment, a specific uplink resource may be allocated dedicatedly for data having a short delay requirement. To this end, the base station may configure, through a RRC configuration message for the UE, whether a specific uplink resource is usable for a specific logical channel. The SR configuration resource 210 and the uplink radio resource 220 may overlap on a time axis 230 or on the time axis 230 and a frequency axis.

When the SR configuration resource 210 and the uplink radio resource 220 overlap on the time axis 230 or on the time axis 230 and the frequency axis as shown in FIG. 2, the UE may need to select one of the SR configuration resource 210 or the uplink radio resource 220 for transmission. The resource selected and used for transmission may be a resource indicating a high priority value of a logical channel having triggered an SR to be transmitted, and a high priority value of a logical channel for data (or data and MAC CEs) to be transmitted using an uplink radio resource. To this end, the UE (e.g., a MAC entity of the UE) may determine a priority value of each uplink radio resource. When a MAC PDU to be transmitted using an uplink radio resource is already generated, a priority of the uplink radio resource may be determined as a highest priority from among priorities of data (or data and MAC CEs) included in the generated MAC PDU.

When the MAC PDU to be transmitted using the uplink radio resource is not generated, the priority of the uplink radio resource may be determined as a highest priority from among priorities of logical channels which may be multiplexed in the uplink radio resource. Therefore, the priority of the uplink radio resource may be determined as a highest priority from among priorities of logical channels (or logical channels and MAC CEs) having data (or data and MAC CEs) to be sent, from among logical channels (or logical channels and MAC CEs) which may use the uplink radio resource.

When an SR configuration exists but an SR transmission with the configuration is not triggered, or when an SR transmission is triggered but is already canceled, the SR configuration should not be selected for transmission. The SR configuration resource not to be transmitted may be excluded when a priority of the SR is compared to a priority of the uplink radio resource, or the UE or the base station may set a priority value of the SR configuration as a specific low value to prevent use for transmission. According to an embodiment, the UE or the base station may set the priority value of the SR configuration as a lowest value to prevent use for transmission.

When an uplink radio resource is allocated but is actually unusable, the radio resource should not be selected for transmission. For example, when the allocated uplink radio resource is a configured grant resource but a configured grant timer for a HARQ process of the configured grant resource is running, the UE may not transmit certain data or control information on the allocated configured grant resource.

As another example, when a certain uplink radio resource is allocated with a CS-RNTI and is a retransmission resource for a configured grant with an NDI which is not toggled, a radio resource allocated when a HARQ buffer of the HARQ process is empty may not be used for transmission.

As another example, although the allocated uplink radio resource is a part of resources of a bundle and is not an initial transmission resource of the bundle, a radio resource allocated when the HARQ buffer of the HARQ process is empty may not be used for transmission. The unusable radio resource may be excluded when priorities of colliding resources are determined, or the UE (e.g., the MAC entity of the UE) may set a priority value of the resource as a specific low value to prevent use for transmission. According to an embodiment, the UE or the base station may set the priority value of the unusable radio resource as a lowest value to prevent use for transmission.

Figure 3:
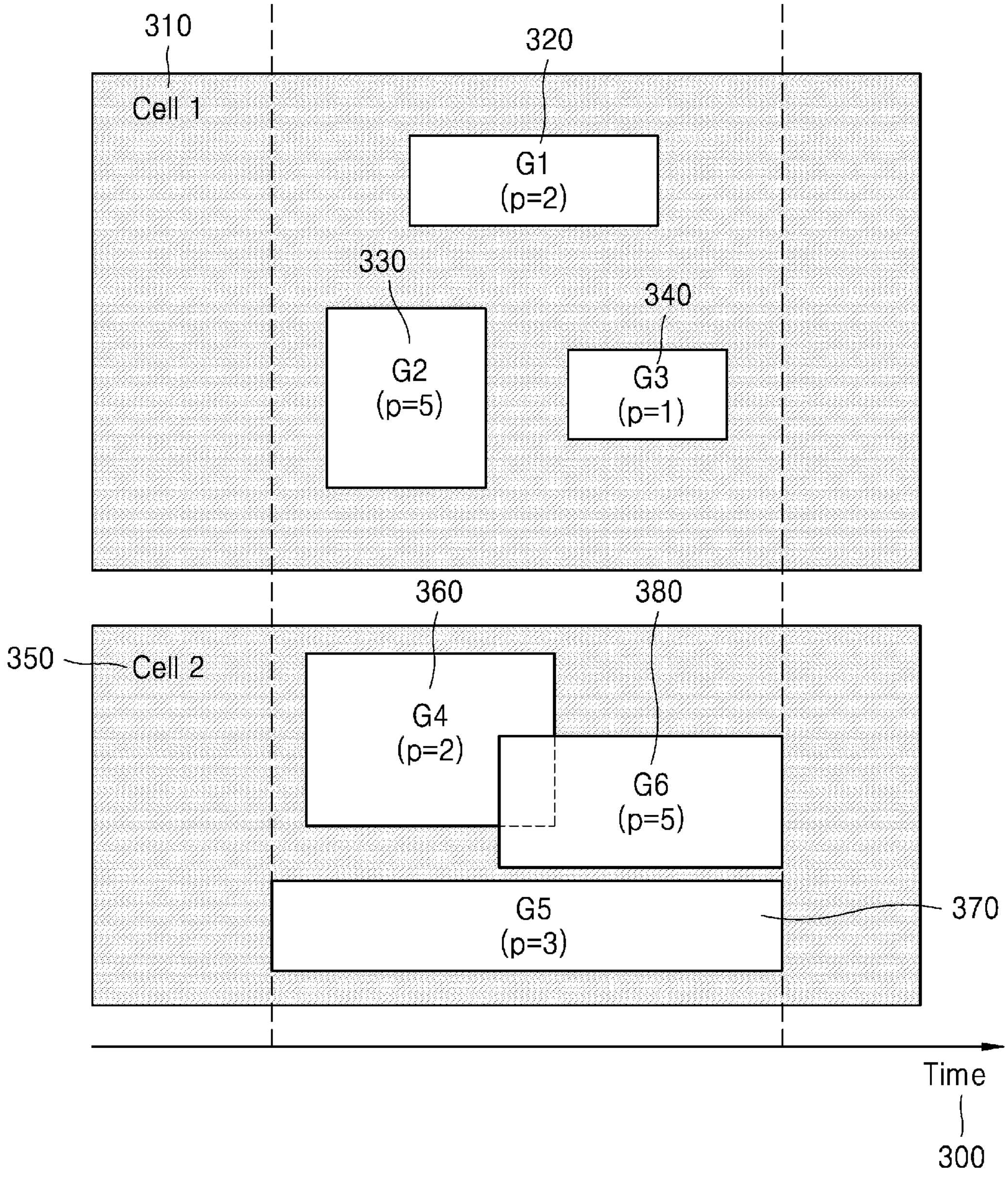
FIG. 3 is a diagram showing a scenario in which uplink resources overlap, according to an embodiment of the disclosure, and problems of a related technology.

FIG. 3 is a diagram showing a scenario in which uplink resources overlap, according to an embodiment of the disclosure, and problems of a related technology. Although FIG. 3 assumes that two cells 310 and 320 are configured for a UE, unlike FIG. 3, more or fewer cells may be configured. A base station may allocate each cell radio resource to the UE, and such a resource allocation unit is called an uplink radio resource (uplink grant). A plurality of uplink radio resources may be allocated at the same timing, but only one uplink radio resource may be transmitted in each cell.

According to an embodiment of the disclosure, an uplink radio resource to be selected and transmitted may be determined based on a priority of each uplink radio resource. When uplink radio resources overlap on a time axis or on time and frequency axes, a high-priority uplink radio resource may be selected and transmitted. When a MAC PDU to be transmitted using an uplink radio resource is already generated, a priority of the uplink radio resource may be determined as a highest priority from among priorities of data or data and MAC CEs included in the generated MAC PDU.

When the MAC PDU to be transmitted using the uplink radio resource is not generated, the priority of the uplink radio resource may be determined as a highest priority from among priorities of logical channels or logical channels and MAC CEs which may be included in a MAC PDU to be transmitted using the radio resource. Therefore, the priority of the uplink radio resource may be determined as a highest priority from among priorities of logical channels having data to be sent by the UE at a timing of determining the priority of the uplink radio resource.

When priorities of both logical channels and MAC CEs need to be considered, the priority of the uplink radio resource may be determined as a highest priority from among priorities of logical channels having data to be sent by the UE and MAC CEs to be sent by the UE at a timing of determining the priority of the uplink radio resource. However, the method of determining the priority of the uplink radio resource is not limited to the above example, and the priority of the uplink radio resource may be determined based on a certain criterion or a certain method.

The embodiment of FIG. 3 shows that a total of three uplink radio resources 320, 330, and 340 are configured for the cell 1 310. Each uplink radio resource may be allocated in a dynamic grant or configured grant manner. The embodiment of FIG. 3 assumes that a priority of each uplink radio resource is determined using the above-described method or another predetermined method. The priority of each uplink radio resource may be defined as a certain value (e.g., a number value).

The embodiment of FIG. 3 assumes that the first uplink radio resource 320 has a priority of 2, the second uplink radio resource 330 has a priority of 5, and the third uplink radio resource 340 has a priority of 1. A total of three uplink radio resources 360, 370, and 380 are configured for the cell 2 350. It is assumed that the fourth uplink radio resource 360 has a priority of 2, the fifth uplink radio resource 370 has a priority of 3, and the sixth uplink radio resource 380 has a priority of 5.

According to an embodiment, uplink radio resources allocated by the base station to the UE may overlap with each other on the time axis. For example, the first uplink radio resource 320 overlaps with the second uplink radio resource 330 and the third uplink radio resource 340 on the time axis in the cell 1 310. The fourth uplink radio resource 360 overlaps with the fifth uplink radio resource 370 on the time axis in the cell 2 350, and overlaps with the sixth uplink radio resource 380 on the time and frequency axes in the cell 2 350.

When uplink radio resources overlap on the time axis or on the time and frequency axes, based on priorities of the uplink radio resources, an uplink radio resource having a high priority (i.e., a small priority value) may be selected and transmitted as a prioritized uplink radio resource (prioritized uplink grant). That is, based on priority values, an uplink radio resource having a highest priority value may be selected and used to transmit at least one of data or control information. The prioritized uplink radio resource may refer to an uplink radio resource determined to be preferentially transmitted based on a priority value.

A deprioritized uplink radio resource (deprioritized uplink grant) may not be transmitted. For example, an uplink radio resource other than the uplink radio resource having the highest priority value may not be used for transmission.

According to an embodiment of the disclosure, prioritization may be a process of determining an uplink radio resource to be transmitted, based on priority values of uplink radio resources. A deprioritized uplink radio resource determined in the prioritization process may have a priority higher than that of another uplink radio resource and thus prevent transmission of the other uplink radio resource. In other words, an uplink radio resource usable for transmission may not be used due to an uplink radio resource other than the uplink radio resource having the highest priority value.

In the embodiment of FIG. 3, the first uplink radio resource 320 has a priority of 2 and thus the second uplink radio resource 330 having a priority of 5 may be determined as a deprioritized uplink radio resource. However, because the first uplink radio resource 320 overlaps on the time axis with and has a priority lower than that of the third uplink radio resource 340 having a priority of 1, the first uplink radio resource 320 may also be determined as a deprioritized uplink radio resource not to be transmitted.

In this case, after the third uplink radio resource 340 is transmitted as a prioritized uplink radio resource, the second uplink radio resource 330 does not overlap with the third uplink radio resource 340 on at least one of the time axis or the frequency axis and thus may be transmittable. However, the second uplink radio resource 330 is determined as the deprioritized uplink radio resource in the prioritization process and thus may not be transmitted. This phenomenon may reduce a radio resource usage rate and degrade key performance indicators (KPIs) such as reliability.

Figure 4:
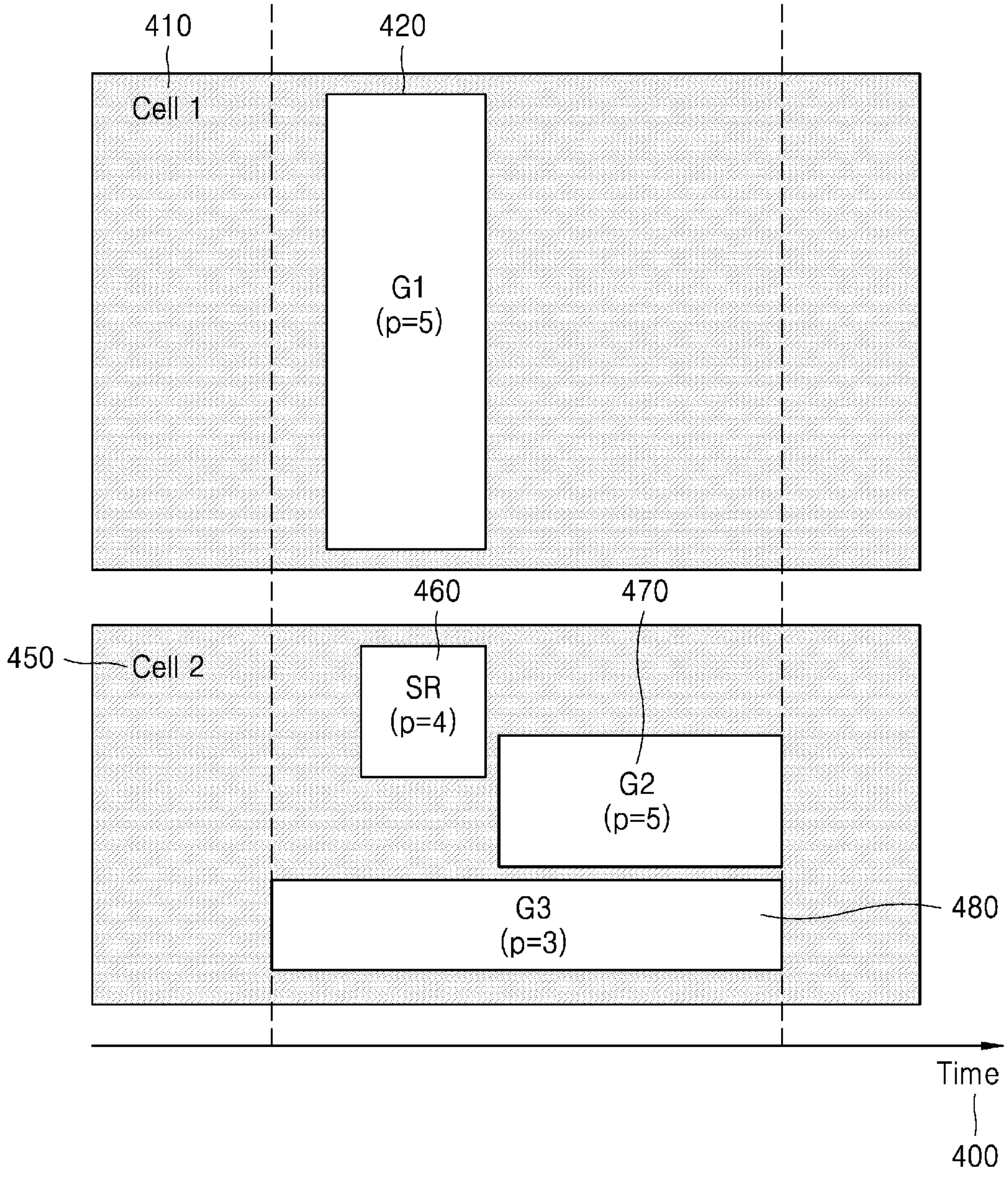
FIG. 4 is a diagram showing a scenario in which uplink resources overlap, according to an embodiment of the disclosure, and problems of a related technology.

FIG. 4 is a diagram showing a scenario in which uplink resources overlap, according to an embodiment of the disclosure, and problems of a related technology. Although FIG. 4 assumes that two cells 410 and 420 are configured for a UE, unlike FIG. 4, more or fewer cells may be configured. A base station may allocate each cell radio resource to the UE, and such a resource allocation unit is called an uplink radio resource (uplink grant). A plurality of uplink radio resources may be allocated at the same timing, but only one uplink radio resource may be transmitted in each cell.

In addition, the base station may configure an SR configuration resource for each cell, and the SR configuration resource may overlap with another SR configuration resource or another uplink radio resource on a time axis or on time and frequency axes. According to an embodiment of the disclosure, an SR configuration resource or uplink radio resource to be selected and transmitted may be determined based on a priority of each uplink radio resource. When SR configuration resources and uplink radio resources overlap on the time axis or on the time and frequency axes, a high-priority SR configuration resource or uplink radio resource may be selected and transmitted. When a MAC PDU to be transmitted using an uplink radio resource is already generated, the priority of the uplink radio resource may be determined as a highest priority from among priorities of data or data and MAC CEs included in the generated MAC PDU.

When the MAC PDU to be transmitted using the uplink radio resource is not generated, the priority of the uplink radio resource may be determined as a highest priority from among priorities of logical channels or logical channels and MAC CEs which may be included in a MAC PDU to be transmitted using the radio resource. Therefore, the priority of the uplink radio resource may be determined as a highest priority from among priorities of logical channels having data to be sent by the UE at a timing of determining the priority of the uplink radio resource.

When priorities of both logical channels and MAC CEs need to be considered, the priority of the uplink radio resource may be determined as a highest priority from among priorities of logical channels having data to be sent by the UE and MAC CEs to be sent by the UE at a timing of determining the priority of the uplink radio resource. The priority of the SR configuration resource may be determined as a priority of a logical channel having triggered an SR. The priority of the SR configuration resource may be determined and used only when the SR configuration resource is usable, that is, only when the SR is triggered. However, the method of determining the priority of the SR configuration resource and the priority of the uplink radio resource is not limited to the above example, and the priority of the SR configuration resource and the priority of the uplink radio resource may be determined based on a certain criterion or a certain method.

The embodiment of FIG. 4 shows that a total of one uplink radio resource 420 is configured for the cell 1 410. Each uplink radio resource may be allocated in a dynamic grant or configured grant manner. The embodiment of FIG. 4 assumes that a priority of each uplink radio resource is determined using the above-described method or another predetermined method. The priority of each uplink radio resource may be defined as a certain value (e.g., a number value).

The embodiment of FIG. 4 assumes that the first uplink radio resource 420 has a priority of 5. One SR configuration resource 460 and two uplink radio resources 470 and 480 are configured for the cell 2 450. It is assumed that the SR configuration resource 460 has a priority of 4. It is also assumed that the second uplink radio resource 470 has a priority of 5, and the third uplink radio resource 480 has a priority of 3.

According to an embodiment, SR configuration resources and uplink radio resources allocated by the base station to the UE may overlap with each other on the time axis. For example, the first uplink radio resource 420 overlaps with the SR configuration resource 460 on the time axis. The third uplink radio resource 480 overlaps with the SR configuration resource 460 on the time axis in the cell 2 450. An SR configuration resource is transmitted in a physical uplink control channel (PUCCH) whereas an uplink radio resource is transmitted in a physical uplink shared channel (PUSCH), and PUCCH transmission and PUSCH transmission may not be simultaneously performed at the same timing due to, for example, uplink power. Therefore, when the SR configuration resource 460 is transmitted, the first uplink radio resource 420 and the third uplink radio resource 480 overlapping with the SR configuration resource 460 on the time axis may not be transmitted.

When SR configuration resources and uplink radio resources overlap on the time axis or on the time and frequency axes, based on priorities of the SR configuration resources and the uplink radio resources, an SR configuration resource or uplink radio resource having a high priority (i.e., a small priority value) may be selected and transmitted as a prioritized SR transmission or a prioritized uplink radio resource (prioritized uplink grant). That is, based on priority values, an SR configuration resource or uplink radio resource having a highest priority value may be selected and used to transmit at least one of data or control information. The prioritized uplink radio resource may refer to an uplink radio resource determined to be preferentially transmitted based on a priority value.

A deprioritized SR transmission or deprioritized uplink radio resource (deprioritized uplink grant) may not be transmitted. For example, an uplink radio resource or SR configuration resource other than the uplink radio resource or SR configuration resource having the highest priority value may not be used for transmission.

According to an embodiment of the disclosure, prioritization may be a process of determining an uplink radio resource to be transmitted, based on priority values of uplink radio resources and priority values of SR configuration resources.

A deprioritized SR configuration resource determined in the prioritization process may have a priority higher than that of another uplink radio resource and thus prevent transmission of the other uplink radio resource. In other words, an uplink radio resource (or SR configuration resource) usable for transmission may not be used due to an uplink radio resource (or SR configuration resource) other than the uplink radio resource (or SR configuration resource) having the highest priority value.

In the embodiment of FIG. 4, the first uplink radio resource 420 has a priority of 5 and thus may be determined as a deprioritized uplink radio resource due to the SR configuration resource 460 having a priority of 4. However, because the third uplink radio resource 480 having a priority of 3 overlaps on the time axis with and has a priority higher than that of the SR configuration resource 460, the SR configuration resource 460 may also be determined as a deprioritized SR transmission not to be transmitted.

In this case, after the third uplink radio resource 480 is transmitted as a prioritized uplink radio resource, the first uplink radio resource 420 may be transmittable because the first uplink radio resource 420 belongs to the cell 1 410 differently from the third uplink radio resource 480, another uplink radio resource overlapping with the first uplink radio resource 420 on at least one of the time axis or the frequency axis does not exist in the cell 1 410, and the SR configuration resource 460 is not transmitted. However, the first uplink radio resource 420 is determined as the deprioritized uplink radio resource and thus may not be transmitted. This phenomenon may reduce a radio resource usage rate and degrade KPIs such as reliability.

Figure 5:
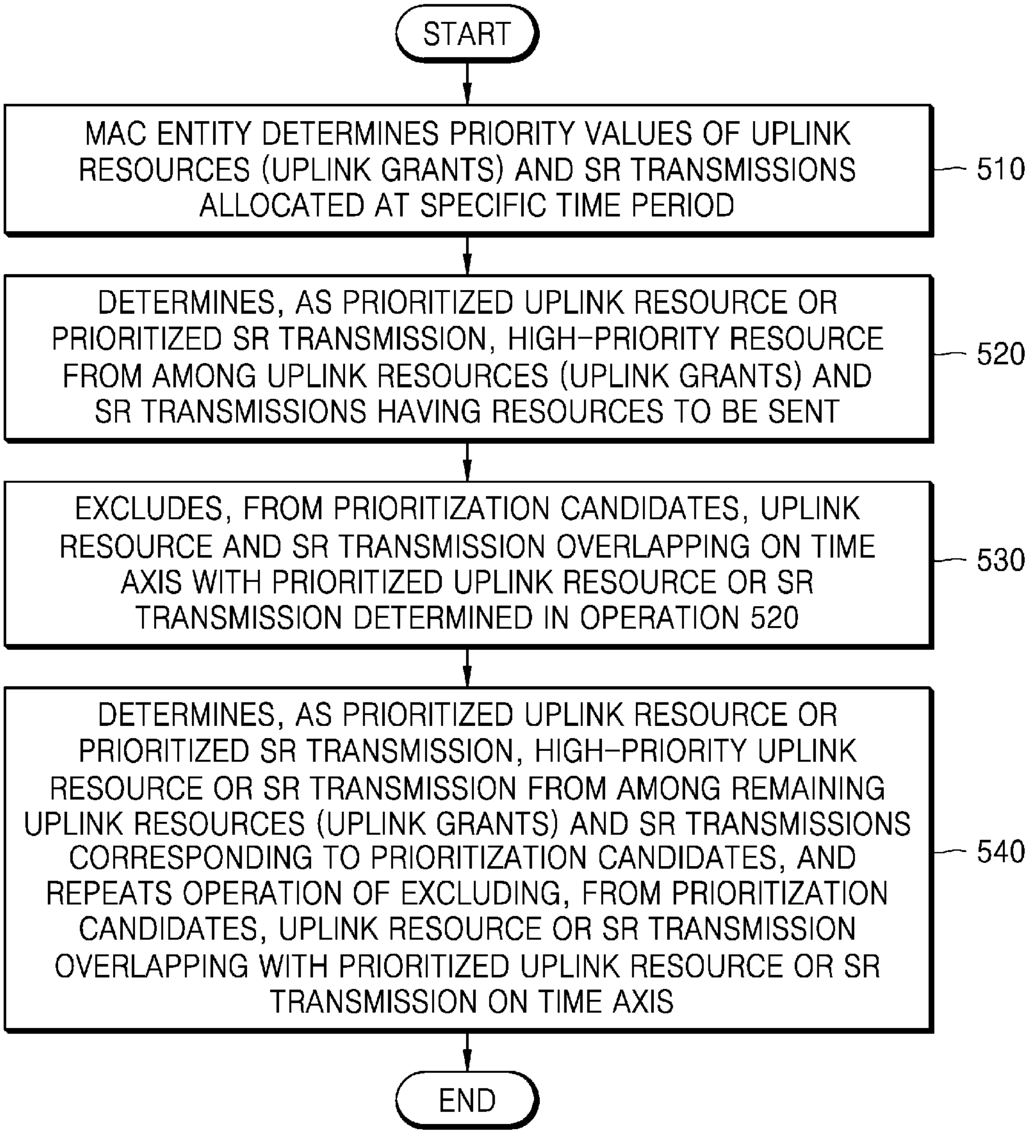
FIG. 5 is a flowchart of a prioritization process according to an embodiment of the disclosure.

FIG. 5 is a flowchart of a prioritization process according to an embodiment of the disclosure. As described above in relation to FIGS. 3 and 4, a phenomenon in which a deprioritized uplink radio resource or a deprioritized SR configuration resource causes another uplink radio resource to be determined as a deprioritized uplink radio resource not to be transmitted may reduce radio resource efficiency and degrade performance. That is, to solve the phenomenon in which the deprioritized uplink radio resource or deprioritized SR configuration resource determined in a prioritization process causes another transmittable uplink radio resource to be determined as being unusable, the embodiment of FIG. 5 proposes a method of excluding, from a prioritization process, an uplink radio resource or SR configuration resource having a priority lower than that of a prioritized uplink radio resource or a prioritized SR configuration resource.

In operation 510, a MAC entity may determine priority values of uplink radio resources (uplink grants) and SR transmissions (i.e., transmissions on triggered SR configuration resources), which are allocated at a specific time period. The MAC entity may be a MAC entity of a UE. The MAC entity may also be a MAC entity of a base station. According to an embodiment of the disclosure, the priority value of each uplink radio resource may be determined using the method described above in relation to FIG. 3 or 4, or another method. The priority value of each SR transmission may be determined as a priority of a logical channel having triggered the SR transmission as described above in relation to FIG. 4, or using another method. In operation 510, the MAC entity sets, as prioritization candidates, data or SR transmissions having resources to be sent. According to an embodiment of the disclosure, the specific time period may be a time defined by a wireless communication system, e.g., a frame, a subframe, a slot, or a mini-slot, or a period arbitrarily set by the UE.

In operation 520, it may be determined whether a high-priority uplink radio resource or SR transmission from among uplink radio resources and SR transmissions having resources to be sent is a prioritized uplink radio resource or a prioritized SR transmission. That is, the prioritized uplink radio resource or the prioritized SR transmission may be determined based on priorities of the uplink radio resources and SR transmissions having resources to be sent.

Because the determination of the prioritized resource starts from the high-priority uplink radio resource or SR transmission in operation 520, a highest-priority uplink radio resource or SR transmission may be determined as a prioritized uplink radio resource or a prioritized SR transmission.

In operation 530, after the prioritized uplink radio resource or the prioritized SR transmission is determined, an uplink radio resource or SR transmission overlapping on a time axis with the prioritized uplink radio resource or prioritized SR transmission determined in operation 520 may be excluded from the prioritization candidates.

According to an embodiment of the disclosure, when the prioritized resource is a prioritized uplink radio resource (prioritized uplink grant) to be transmitted in a PUSCH, an uplink radio resource or SR transmission resource overlapping with the prioritized uplink radio resource on the time axis in the same cell or the same bandwidth part (BWP) may be determined as a deprioritized uplink radio resource or a deprioritized SR transmission.

When the prioritized resource is a prioritized SR transmission to be transmitted in a PUCCH, all uplink radio resources and SR transmission resources in the same MAC entity or UE may be determined as deprioritized uplink radio resources or deprioritized SR transmissions. The deprioritized uplink radio resource or deprioritized SR transmission overlapping with the prioritized resource on the time axis may be subsequently excluded from the prioritization candidates.

In operation 540, a highest-priority uplink radio resource or SR transmission resource from among the remaining uplink radio resources and SR transmissions set as the prioritization candidates, i.e., the uplink radio resources and SR transmissions which are not yet determined as deprioritized uplink radio resources or deprioritized SR transmissions, may be determined as a prioritized uplink radio resource or a prioritized SR transmission. That is, a prioritized uplink radio resource or SR transmission other than the prioritized uplink radio resource or prioritized SR transmission determined in operation 520 may be determined.

According to an embodiment of the disclosure, as in operation 530, the MAC entity may repeat the process of excluding, from the prioritization candidates, an uplink radio resource or SR transmission overlapping with the prioritized uplink radio resource or the prioritized SR transmission on the time axis. Thereafter, operation 540 may be repeated until no more uplink radio resources or SR configuration resources set as the prioritization candidates remain.

When operations 510 to 540 of FIG. 5 are applied to the resource configuration shown in FIG. 3, the following prioritization process is performed.

- The third uplink radio resource 340 having a highest priority (p=1) is determined as a prioritized uplink radio resource. The first uplink radio resource 320 overlapping with the third uplink radio resource 340 on the time axis of the cell 1 310 is determined as a deprioritized uplink radio resource, and subsequently excluded from the prioritization process (i.e., excluded from the prioritization candidates).
- The fourth uplink radio resource 360 having a next highest priority is determined as a prioritized uplink radio resource. The sixth uplink radio resource 380 and the fifth uplink radio resource 370 overlapping with the fourth uplink radio resource 360 on the time axis of the cell 2 350 are determined as deprioritized uplink radio resources, and subsequently excluded from the prioritization process (i.e., excluded from the prioritization candidates).
- The second uplink radio resource 330 having a next highest priority (i.e., the only prioritization candidate at present) is determined as a prioritized uplink radio resource. The prioritization process is terminated because no more prioritization candidate resources remain.

When operations 510 to 540 of FIG. 5 are applied to the resource configuration shown in FIG. 4, the following prioritization process is performed.

- The third uplink radio resource 480 having a highest priority (p=3) is determined as a prioritized uplink radio resource. The second uplink radio resource 470 and the SR transmission 460 overlapping with the third uplink radio resource 480 on the time axis of the cell 1 410 are respectively determined as a deprioritized uplink radio resource and a deprioritized SR transmission, and subsequently excluded from the prioritization process (i.e., excluded from the prioritization candidates).
- The first uplink radio resource 420 having a next highest priority (i.e., the only prioritization candidate at present) is determined as a prioritized uplink radio resource. The prioritization process is terminated because no more prioritization candidate resources remain.

Figure 6:
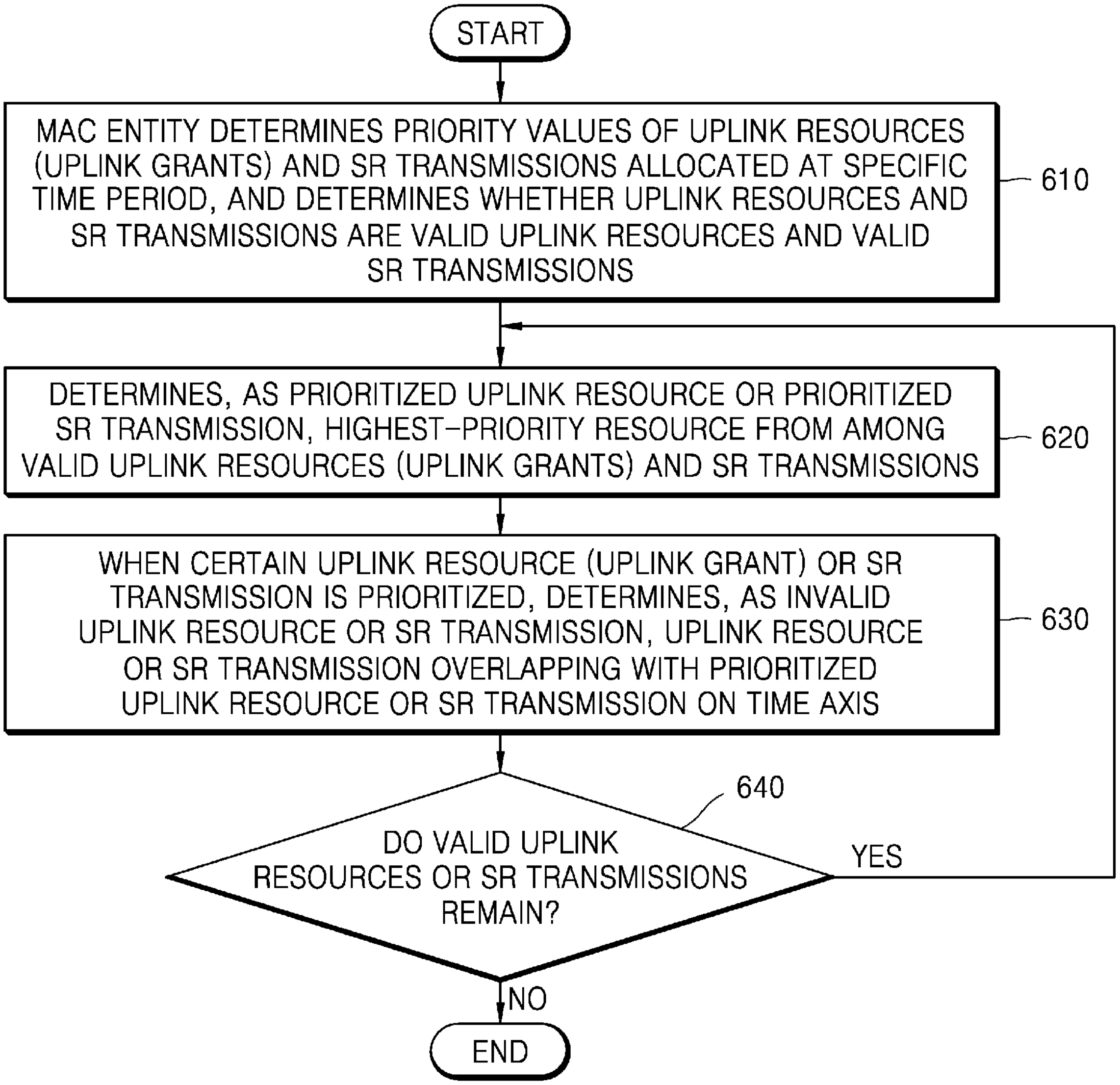
FIG. 6 is a flowchart of a prioritization process according to an embodiment of the disclosure.

FIG. 6 is a flowchart of a prioritization process according to an embodiment of the disclosure. As described above in relation to FIGS. 3 and 4, a phenomenon in which a deprioritized uplink radio resource or a deprioritized SR configuration resource causes another uplink radio resource to be determined as a deprioritized uplink radio resource not to be transmitted may reduce radio resource efficiency and degrade performance. That is, to solve the phenomenon in which the deprioritized uplink radio resource or the deprioritized SR configuration resource determined in a prioritization process causes another transmittable uplink radio resource to be determined as being unusable, the embodiment of FIG. 6 proposes a method of excluding, from a prioritization process, an uplink radio resource or SR configuration resource having a priority lower than that of a prioritized uplink radio resource or a prioritized SR configuration resource.

In operation 610, a MAC entity may determine priority values of uplink radio resources (uplink grants) and SR transmissions (i.e., transmissions on triggered SR configuration resources), which are allocated at a specific time period, and determine whether the uplink radio resources and the SR transmissions are valid uplink radio resources and valid SR transmissions. According to an embodiment of the disclosure, the priority value of each uplink radio resource may be determined using the method described above in relation to FIG. 3 or 4, or another method. The priority value of each SR transmission may be determined as a priority of a logical channel having triggered the SR transmission as described above in relation to FIG. 4, or using another method.

According to an embodiment of the disclosure, the valid uplink radio resource or the valid SR transmission refers to a transmittable uplink radio resource or a transmittable SR transmission. For example, an SR configuration resource without SR triggering may not be used for transmission and thus may not be a valid SR transmission. An uplink radio resource not usable for data transmission may not be a valid uplink radio resource. However, the criterion for determining whether the uplink radio resources and the SR transmissions are valid is not limited to the above example, and it may be determined whether the uplink radio resources and the SR transmissions are valid, by using various criteria or methods. In operation 610, the MAC entity determine valid uplink radio resources or valid SR transmissions, and use the valid resources as prioritization candidates in a subsequent operation. According to an embodiment of the disclosure, the specific time period may be a time defined by a wireless communication system, e.g., a frame, a subframe, a slot, or a mini-slot, or a period arbitrarily set by the UE.

In operation 620, it may be determined whether a high-priority uplink radio resource or SR transmission from among the valid uplink radio resources and SR transmissions is a prioritized uplink radio resource or a prioritized SR transmission. That is, the prioritized uplink radio resource or the prioritized SR transmission may be determined based on priorities of the valid uplink radio resources and SR transmissions.

In operation 620, the high-priority uplink radio resource or SR transmission has a highest-priority and thus may be determined as a prioritized uplink radio resource or a prioritized SR transmission.

In operation 630, when a certain uplink radio resource or SR transmission is prioritized, an uplink radio resource or SR transmission overlapping with the prioritized uplink radio resource or SR transmission on a time axis may not be prioritized and thus is determined as an invalid uplink radio resource or an invalid SR transmission. The invalid uplink radio resource and the invalid SR transmission may be excluded from a subsequent operation for determining a prioritized uplink radio resource or a prioritized SR transmission. In this case, when the prioritized resource is a prioritized uplink radio resource (prioritized uplink grant) to be transmitted in a PUSCH, an uplink radio resource or SR transmission resource overlapping with the prioritized uplink radio resource on the time axis in the same cell or the same BWP may be determined as an invalid uplink radio resource or an invalid SR transmission.

When the prioritized resource is a prioritized SR transmission to be transmitted in a PUCCH, all uplink radio resources and SR transmission resources in the same MAC entity or UE may be determined as invalid uplink radio resources or invalid SR transmissions. The deprioritized uplink radio resource or deprioritized SR transmission overlapping with the prioritized resource on the time axis may be invalid and thus subsequently excluded from the prioritization candidates.

In operation 640, it may be determined whether valid uplink radio resources or valid SR transmissions remain at the specific time period. When valid uplink radio resources or valid SR transmissions remain, the process returns to operation 620 and a highest-priority resource from among the remaining valid uplink radio resources and valid SR transmissions is prioritized. A resource overlapping with the new prioritized uplink radio resource or prioritized SR transmission on the time axis is determined as being invalid. The MAC layer repeats the process of FIG. 6 until no more valid uplink radio resources or valid SR transmissions remain. Herein, the invalid uplink radio resources or invalid SR transmissions may be determined as deprioritized uplink radio resources or deprioritized SR transmissions.

When operations 610 to 640 of FIG. 6 are applied to the resource configuration shown in FIG. 3, the following prioritization process is performed.

- The third uplink radio resource 340 having a highest priority (p=1) from among valid uplink radio resources is determined as a prioritized uplink radio resource. The first uplink radio resource 320 overlapping with the third uplink radio resource 340 on the time axis of the cell 1 310 is determined as an invalid uplink radio resource. Eventually, the first uplink radio resource 320 is determined as a deprioritized uplink radio resource.
- The fourth uplink radio resource 360 having a next highest priority from among the remaining valid uplink radio resources is determined as a prioritized uplink radio resource. The fifth uplink radio resource 370 and the sixth uplink radio resource 380 overlapping with the fourth uplink radio resource 360 on the time axis of the cell 2 350 are determined as invalid uplink radio resources. Eventually, the fifth uplink radio resource 370 and the sixth uplink radio resource 380 are determined as deprioritized uplink radio resources.
- The second uplink radio resource 330, which is the only remaining valid uplink radio resource, is determined as a prioritized uplink radio resource. The prioritization process is terminated because no more prioritization candidate resources remain.

When operations 610 to 640 of FIG. 6 are applied to the resource configuration shown in FIG. 4, the following prioritization process is performed.

- The third uplink radio resource 480 having a highest priority (p=3) from among valid uplink radio resources and SR transmissions is determined as a prioritized uplink radio resource. The second uplink radio resource 470 and the SR transmission 460 overlapping with the third uplink radio resource 480 on the time axis of the cell 1 410 are respectively determined as an invalid uplink radio resource and an invalid SR transmission. Eventually, the second uplink radio resource 470 and the SR transmission 460 are deprioritized.
- The first uplink radio resource 420, which is the only remaining valid uplink radio resource, is determined as a prioritized uplink radio resource. The prioritization process is terminated because no more prioritization candidate resources remain.

Figure 7:
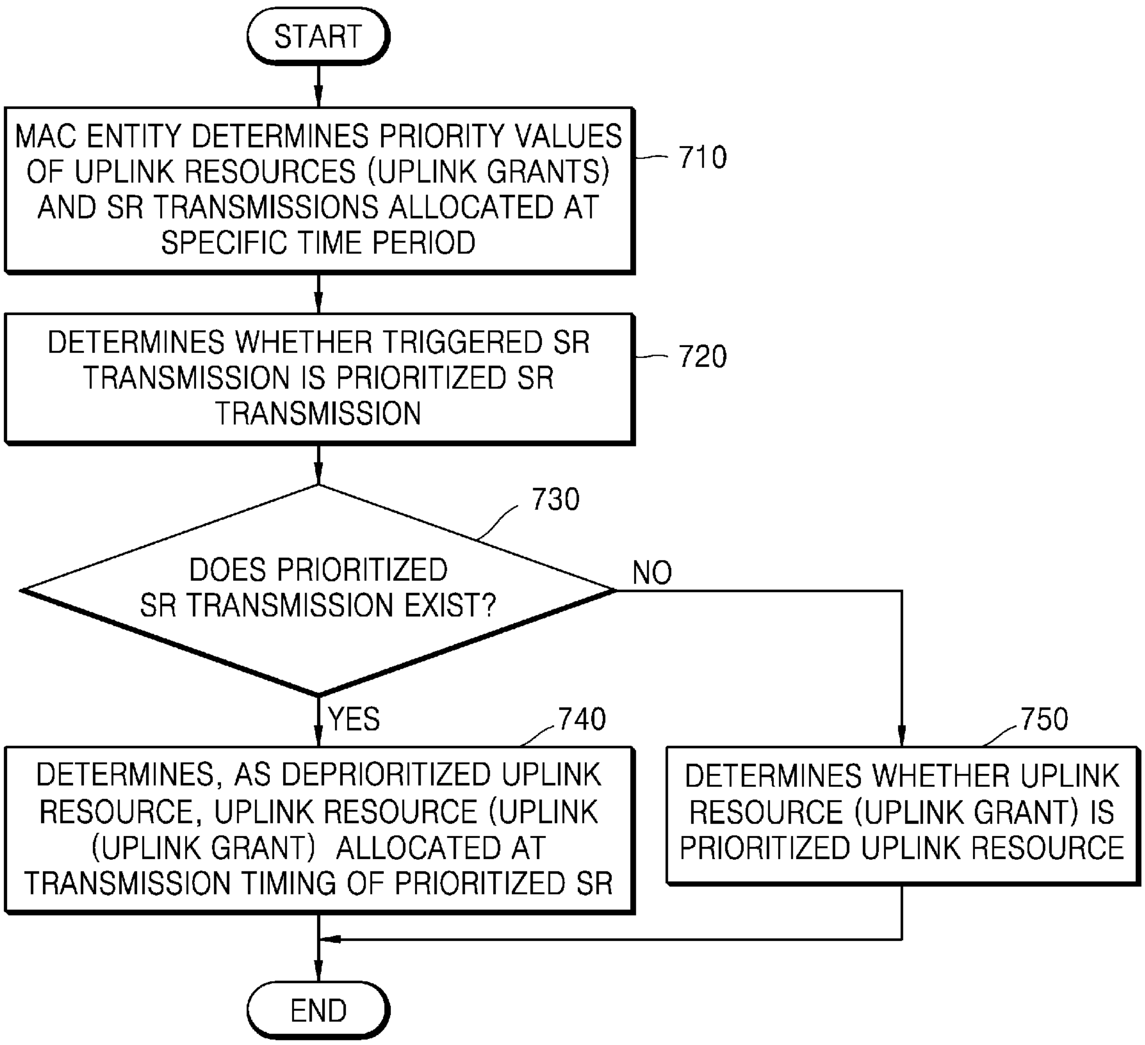
FIG. 7 is a flowchart of a prioritization process according to an embodiment of the disclosure.

FIG. 7 is a flowchart of a prioritization process according to an embodiment of the disclosure. As described above in relation to FIG. 4, a phenomenon in which a deprioritized SR configuration resource causes another uplink radio resource to be determined as a deprioritized uplink radio resource not to be transmitted may reduce radio resource efficiency and degrade performance. That is, to solve the phenomenon in which the deprioritized SR configuration resource determined in a prioritization process causes another transmittable uplink radio resource to be determined as being unusable, the embodiment of FIG. 7 proposes a method of excluding, from a prioritization process, an SR configuration resource having a priority lower than that of a prioritized uplink radio resource or a prioritized SR configuration resource.

In operation 710, initially, a MAC entity may determine priority values of uplink radio resources (uplink grants) and SR transmissions (i.e., transmissions on triggered SR configuration resources), which are allocated at a specific time period. According to an embodiment of the disclosure, the priority value of each uplink radio resource may be determined using the method described above in relation to FIG. 3 or 4, or another method. The priority value of each SR transmission may be determined as a priority of a logical channel having triggered the SR transmission as described above in relation to FIG. 4, or using another method. According to an embodiment of the disclosure, the specific time period may be a time defined by a wireless communication system, e.g., a frame, a subframe, a slot, or a mini-slot, or a period arbitrarily set by the UE.

In operation 720, it may be determined whether a triggered SR transmission is a prioritized SR transmission. When an uplink radio resource (i.e., a resource to be transmitted in a PUSCH) overlapping on a time axis with and having a priority higher than or equal to that of the triggered SR transmission exists, the SR transmission may not be determined as a prioritized SR transmission. When an uplink radio resource overlapping on a time axis with and having a priority higher than or equal to that of the triggered SR transmission does not exist, the SR transmission may be determined as a prioritized SR transmission. When the prioritized SR transmission exists, an uplink radio resource allocated at a transmission timing of the prioritized SR may be determined as a deprioritized uplink radio resource. In other words, an uplink radio resource overlapping with the SR transmission on the time axis may be determined as a deprioritized uplink radio resource.

In operation 730, the MAC entity may determine whether a prioritized SR transmission exists.

When the prioritized SR transmission exists, in operation 740, because the prioritized resource is a prioritized SR transmission to be transmitted in a PUCCH, all uplink radio resources and SR transmission resources in the same MAC entity or UE may be determined as deprioritized uplink radio resources or deprioritized SR transmissions. It may be determined whether an uplink radio resource not overlapping with the SR transmission resource on the time axis is a prioritized uplink radio resource, based on preset rules.

When the SR transmission is not a prioritized SR transmission, in operation 750, it may be determined whether an uplink radio resource is a prioritized uplink radio resource, based on preset rules. According to an embodiment of the disclosure, based on the preset rules, an uplink radio resource may be determined as a prioritized uplink radio resource when another uplink radio resource overlapping with and having a priority higher than that of the uplink radio resource does not exist. In operation 750, because a prioritized SR transmission overlapping with the uplink radio resources on the time axis is not triggered, the SR transmission overlapping on the time axis is not considered and a high-priority resource may be determined as a prioritized uplink radio resource by merely comparing the priorities of the uplink radio resources overlapping on the time axis in a cell.

When operations 710 to 750 of FIG. 7 are applied to the resource configuration shown in FIG. 4, the following prioritization process is performed.

- Because the third uplink radio resource 480 having a priority higher than that of the SR transmission 460 exists, the SR transmission 460 is not determined as a prioritized SR transmission.
- The third uplink radio resource 480 having a highest priority (p=3) from among uplink radio resources and SR transmissions is determined as a prioritized uplink radio resource.
- The second uplink radio resource 470 overlaps on the time axis with and has a priority lower than that of the third uplink radio resource 480, and thus is determined as a deprioritized uplink radio resource.
- The first uplink radio resource 420 does not overlap with any uplink radio resource on the time axis, and thus is determined as a prioritized uplink radio resource.

Figure 8:
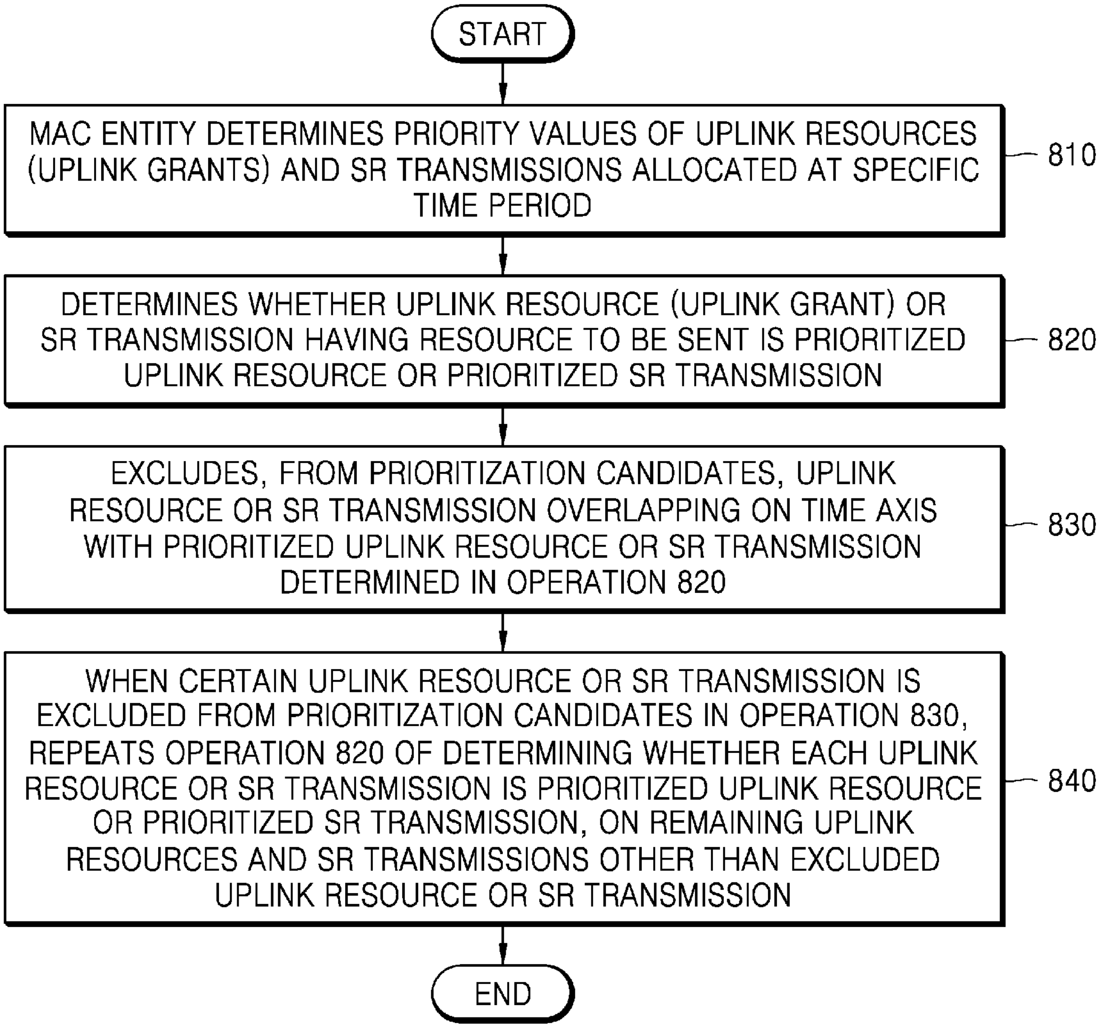
FIG. 8 is a flowchart of a prioritization process according to an embodiment of the disclosure.

FIG. 8 is a flowchart of a prioritization process according to an embodiment of the disclosure. As described above in relation to FIGS. 3 and 4, a phenomenon in which a deprioritized uplink radio resource or a deprioritized SR configuration resource causes another uplink radio resource to be determined as a deprioritized uplink radio resource not to be transmitted may reduce radio resource efficiency and degrade performance. That is, to solve the phenomenon in which the deprioritized uplink radio resource or the deprioritized SR configuration resource determined in a prioritization process causes another transmittable uplink radio resource to be determined as being unusable, the embodiment of FIG. 8 proposes a method of excluding, from a prioritization process, an uplink radio resource or SR configuration resource having a priority lower than that of a prioritized uplink radio resource or a prioritized SR configuration resource.

In operation 810, a MAC entity may determine priority values of uplink radio resources (uplink grants) and SR transmissions (i.e., transmissions on triggered SR configuration resources), which are allocated at a specific time period. According to an embodiment of the disclosure, the priority value of each uplink radio resource may be determined using the method described above in relation to FIG. 3 or 4, or another method. The priority value of each SR transmission may be determined as a priority of a logical channel having triggered the SR transmission as described above in relation to FIG. 4, or using another method. In operation 810, the MAC entity sets, as prioritization candidates, data or SR transmissions having resources to be sent. According to an embodiment of the disclosure, the specific time period may be a time defined by a wireless communication system, e.g., a frame, a subframe, a slot, or a mini-slot, or a period arbitrarily set by the UE.

In operation 820, it may be determined whether one of uplink radio resources and SR transmissions having resources to be sent is a prioritized uplink radio resource or a prioritized SR transmission. That is, the prioritized uplink radio resource or the prioritized SR transmission may be determined based on priorities of the uplink radio resources and SR transmissions having resources to be sent.

According to an embodiment of the disclosure, an uplink radio resource may be determined as a prioritized uplink radio resource when another uplink radio resource or SR transmission overlapping with and having a priority higher than that of the uplink radio resource does not exist. An SR transmission may be determined as a prioritized SR transmission when another uplink radio resource overlapping with and having a priority higher than that of the SR transmission does not exist.

In operation 830, after the prioritized uplink radio resource or the prioritized SR transmission is determined, an uplink radio resource and SR transmission overlapping on a time axis with the prioritized uplink radio resource or prioritized SR transmission determined in operation 820 may be excluded from the prioritization candidates.

According to an embodiment of the disclosure, when the prioritized resource is a prioritized uplink radio resource (prioritized uplink grant) to be transmitted in a PUSCH, an uplink radio resource or SR transmission resource overlapping with the prioritized uplink radio resource on the time axis in the same cell or the same BWP may be determined as a deprioritized uplink radio resource or a deprioritized SR transmission.

When the prioritized resource is a prioritized SR transmission to be transmitted in a PUCCH, all uplink radio resources and SR transmission resources in the same MAC entity or UE may be determined as deprioritized uplink radio resources or deprioritized SR transmissions. The deprioritized uplink radio resource or deprioritized SR transmission overlapping with the prioritized resource on the time axis may be subsequently excluded from the prioritization candidates.

In operation 840, when a certain uplink radio resource or SR transmission is excluded from the prioritization candidates, operation 820 for determining whether each uplink radio resource or SR transmission is a prioritized uplink radio resource or a prioritized SR transmission is repeated on the remaining uplink radio resources and SR transmissions other than the excluded uplink radio resource or SR transmission. Because the uplink radio resource or SR transmission not to be transmitted is excluded from the prioritization process in operation 830, the prioritization determination result of operation 840 may differ.

Figure 9:
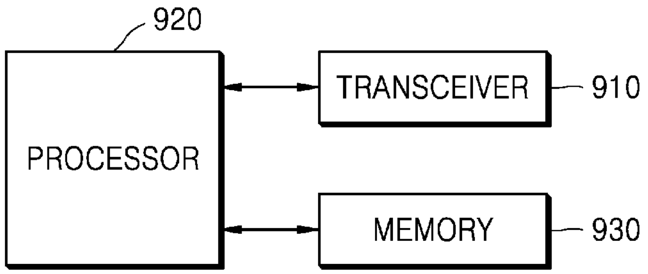
FIG. 9 is a block diagram of a user equipment (UE) according to an embodiment of the disclosure.

FIG. 9 is a block diagram of a UE according to an embodiment of the disclosure.

Referring to FIG. 9, the UE may include a transceiver 910, a processor 920, and a memory 930. In the disclosure, the processor 920 may be a circuit, an application-specific integrated circuit, or at least one processor. The UE is not limited to the above example, and may include more or fewer elements than those illustrated in FIG. 9. In addition, the transceiver 910, the processor 920, and the memory 930 may be implemented in the form of a single chip.

The transceiver 910 may transmit or receive signals to or from another network entity. The transceiver 910 may, for example, receive system information or receive a synchronization signal or a reference signal from a base station. The signals transmitted to or received from the base station or the network entity may include control information and data. To this end, the transceiver 910 may include, for example, a radio-frequency (RF) transmitter for up-converting a frequency of and amplifying a signal to be transmitted, and an RF receiver for low-noise-amplifying and down-converting a frequency of a received signal. However, the RF transmitter and the RF receiver are merely examples and the elements of the transceiver 910 are not limited thereto. The transceiver 910 may receive signals through wireless channels and output the signals to the processor 920, and transmit signals output from the processor 920, through the wireless channels.

The processor 920 may control overall operations of the UE, according to an embodiment of the disclosure. For example, the processor 920 may control the flow of signals between blocks to perform the above-described operations based on each flowchart.

The memory 930 may store at least one of information transmitted or received by the transceiver 910, and information generated by the processor 920. The memory 930 may store programs and data required to operate the UE. The memory 930 may also store control information or data included in signals obtained by the UE. The memory 930 may include one or a combination of storage media such as read-only memory (ROM), random access memory (RAM), a hard disk, a compact disc-ROM (CD-ROM), and a digital versatile disc (DVD). The memory 930 may include a plurality of memories.

Figure 10:
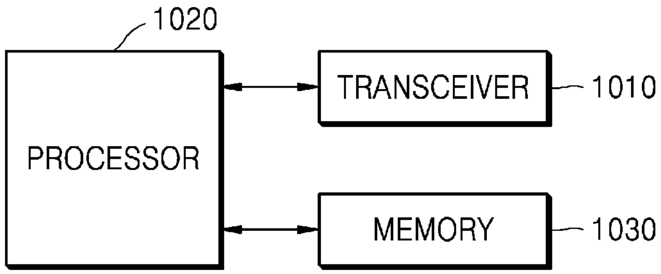
FIG. 10 is a block diagram of a base station according to an embodiment of the disclosure.

FIG. 10 is a block diagram of a base station according to an embodiment of the disclosure.

Referring to FIG. 10, the base station may include a transceiver 1010, a processor 1020, and a memory 1030. In the disclosure, the processor 1020 may be a circuit, an application-specific integrated circuit, or at least one processor. The base station is not limited to the above example, and may include more or fewer elements than those illustrated in FIG. 10. In addition, the transceiver 1010, the processor 1020, and the memory 1030 may be implemented in the form of a single chip.

The transceiver 1010 may transmit or receive signals to or from another network entity. The transceiver 1010 may, for example, transmit system information or transmit a synchronization signal or a reference signal to a UE. The signals transmitted to or received from the UE or the network entity may include control information and data. To this end, the transceiver 1010 may include, for example, an RF transmitter for up-converting a frequency of and amplifying a signal to be transmitted, and an RF receiver for low-noise-amplifying and down-converting a frequency of a received signal. However, the RF transmitter and the RF receiver are merely examples and the elements of the transceiver 1010 are not limited thereto. The transceiver 1010 may receive signals through wireless channels and output the signals to the processor 1020, and transmit signals output from the processor 1020, through the wireless channels.

The processor 1020 may control overall operations of the base station, according to an embodiment of the disclosure. For example, the processor 1020 may control the flow of signals between blocks to perform the above-described operations based on each flowchart.

The memory 1030 may store at least one of information transmitted or received by the transceiver 1010, and information generated by the processor 1020. The memory 1030 may store programs and data required to operate the base station. The memory 1030 may also store control information or data included in signals obtained by the network entity. The memory 1030 may include one or a combination of storage media such as ROM, RAM, a hard disk, a CD-ROM, and a DVD. The memory 1030 may include a plurality of memories.

Figure 11:
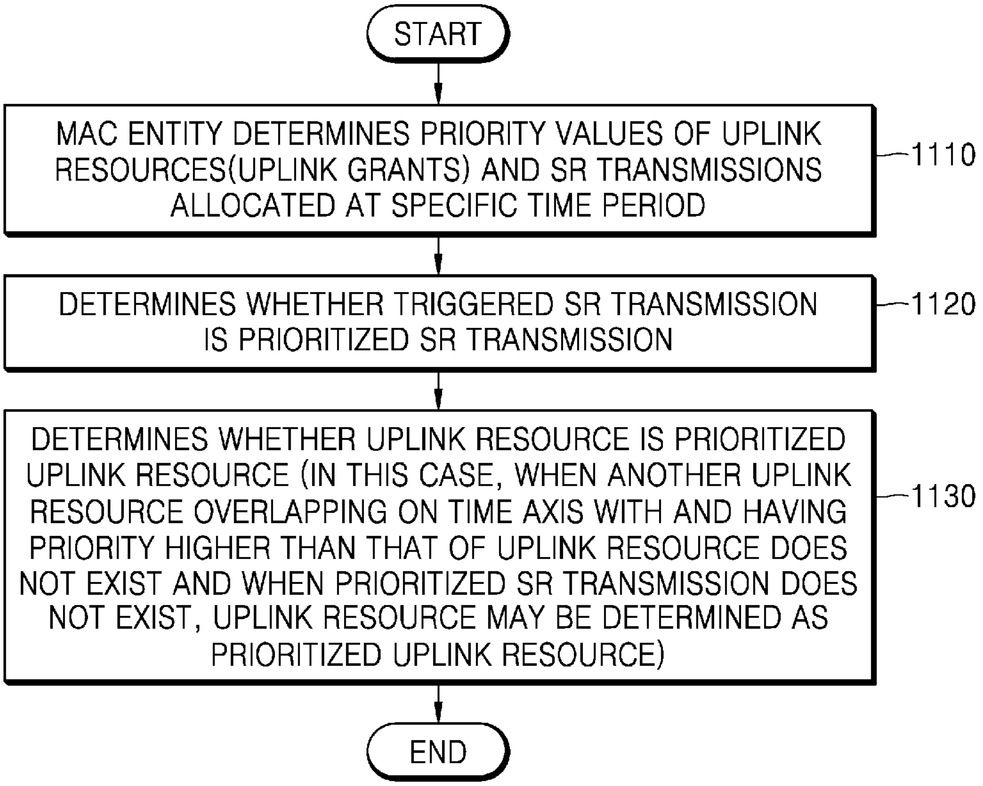
FIG. 11 is a flowchart of a prioritization process according to an embodiment of the disclosure.

FIG. 11 is a flowchart of a prioritization process according to an embodiment of the disclosure. As described above in relation to FIG. 4, a phenomenon in which a deprioritized SR configuration resource causes another uplink radio resource to be determined as a deprioritized uplink radio resource not to be transmitted may reduce radio resource efficiency and degrade performance. That is, to solve the phenomenon in which the deprioritized SR configuration resource determined in a prioritization process causes another transmittable uplink radio resource to be determined as being unusable, the embodiment of FIG. 11 proposes a method of excluding, from a prioritization process, an SR configuration resource having a priority lower than that of a prioritized uplink radio resource or a prioritized SR configuration resource.

In operation 1110, a MAC entity may determine priority values of uplink radio resources (uplink grants) and SR transmissions (i.e., transmissions on triggered SR configuration resources), which are allocated at a specific time period. According to an embodiment of the disclosure, the priority value of each uplink radio resource may be determined using the method described above in relation to FIG. 3 or 4, or another method. The priority value of each SR transmission may be determined as a priority of a logical channel having triggered the SR transmission as described above in relation to FIG. 4, or using another method. According to an embodiment of the disclosure, the specific time period may be a time defined by a wireless communication system, e.g., a frame, a subframe, a slot, or a mini-slot, or a period arbitrarily set by the UE.

In operation 1120, it may be determined whether a triggered SR transmission is a prioritized SR transmission. When an uplink radio resource (i.e., a resource to be transmitted in a PUSCH) overlapping on a time axis with and having a priority higher than or equal to that of the triggered SR transmission exists, the SR transmission may not be determined as a prioritized SR transmission. When an uplink radio resource overlapping on a time axis with and having a priority higher than or equal to that of the triggered SR transmission does not exist, the SR transmission may be determined as a prioritized SR transmission. When the prioritized SR transmission exists, an uplink radio resource allocated at a transmission timing of the prioritized SR may be determined as a deprioritized uplink radio resource. In other words, an uplink radio resource overlapping with the SR transmission on the time axis may be determined as a deprioritized uplink radio resource. According to an embodiment of the disclosure, in operation 1120, the MAC entity may initially determine whether the triggered SR transmission other than an uplink radio resource is a prioritized SR transmission.

In operation 1130, the MAC entity may determine whether each uplink radio resource is a prioritized uplink radio resource. The MAC entity may determine whether each uplink radio resource is a prioritized uplink radio resource, by determining whether another uplink radio resource or a prioritized SR transmission overlapping with the uplink radio resource on the time axis exists. Specifically, when the uplink radio resource is a configured grant, and when condition 1) that a configured grant resource having a priority higher than that of and overlapping on the time axis with the uplink radio resource does not exist, condition 2) that a dynamic grant resource having a priority higher than or equal to that of and overlapping on the time axis with the uplink radio resource does not exist, and condition 3) that a prioritized SR transmission having a priority higher than that of and overlapping on the time axis with the uplink radio resource does not exist are satisfied, the uplink radio resource may be determined as a prioritized uplink radio resource.

When the uplink radio resource is a dynamic grant (i.e., a radio resource allocated with a cell radio network temporary identifier (C-RNTI) or a CS-RNTI), and when condition 1) that a configured grant resource having a priority higher than that of and overlapping on the time axis with the uplink radio resource does not exist, condition 2) that a dynamic grant resource having a priority higher than that of and overlapping on the time axis with the uplink radio resource does not exist, and condition 3) that a prioritized SR transmission having a priority higher than that of and overlapping on the time axis with the uplink radio resource does not exist are satisfied, the uplink radio resource may be determined as a prioritized uplink radio resource. When the above-described operation of determining whether the uplink radio resource is a prioritized uplink radio resource is not performed on an uplink radio resource determined as a "deprioritized uplink radio resource", that is, when an uplink radio resource is not yet determined as a prioritized uplink radio resource or a deprioritized uplink radio resource, the operation of comparing with the prioritized SR transmission (i.e., condition 3)) is not required.

When operations 1110 to 1130 of FIG. 11 are applied to the resource configuration of FIG. 4, the following prioritization process is performed.

- Because the third uplink radio resource 480 having a priority higher than that of the SR transmission 460 exists, the SR transmission 460 is not determined as a prioritized SR transmission.
- The third uplink radio resource 480 having a highest priority (p=3) from among uplink radio resources and SR transmissions is determined as a prioritized uplink radio resource.
- The second uplink radio resource 470 overlaps on the time axis with and has a priority lower than that of the third uplink radio resource 480, and thus is determined as a deprioritized uplink radio resource.
- The first uplink radio resource 420 does not overlap with any uplink radio resource on the time axis, and thus is determined as a prioritized uplink radio resource.

Figure 12:
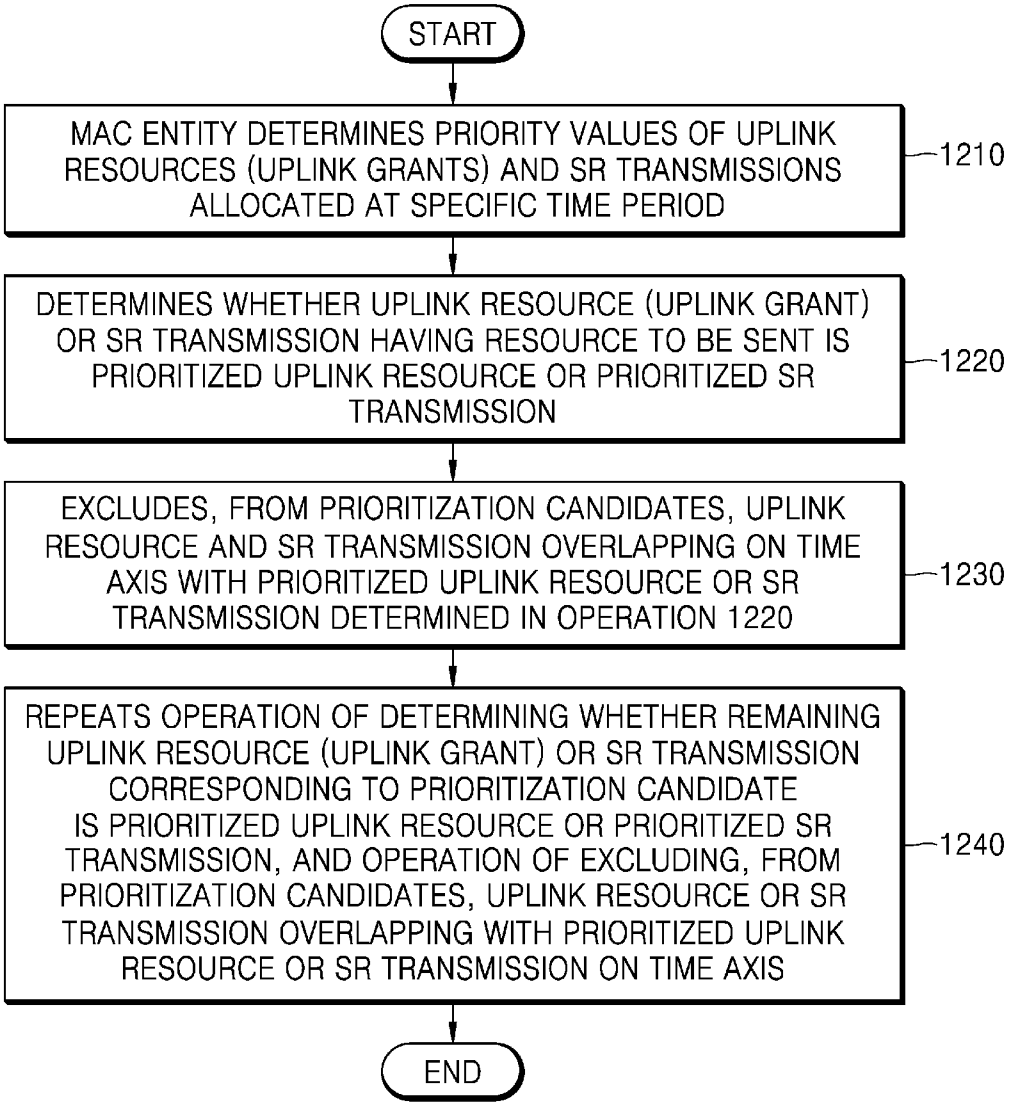
FIG. 12 is a flowchart of a prioritization process according to an embodiment of the disclosure.

FIG. 12 is a flowchart of a prioritization process according to an embodiment of the disclosure. As described above in relation to FIGS. 3 and 4, a phenomenon in which a deprioritized uplink radio resource or a deprioritized SR configuration resource causes another uplink radio resource to be determined as a deprioritized uplink radio resource not to be transmitted may reduce radio resource efficiency and degrade performance. That is, to solve the phenomenon in which the deprioritized uplink radio resource or the deprioritized SR configuration resource determined in a prioritization process causes another transmittable uplink radio resource to be determined as being unusable, the embodiment of FIG. 12 proposes a method of excluding, from a prioritization process, an uplink radio resource or SR configuration resource having a priority lower than that of a prioritized uplink radio resource or a prioritized SR configuration resource.

In operation 1210, a MAC entity may determine priority values of uplink radio resources (uplink grants) and SR transmissions (i.e., transmissions on triggered SR configuration resources), which are allocated at a specific time period.

According to an embodiment of the disclosure, the MAC entity may be a MAC entity of a UE. The MAC entity is not limited to the above example and may also be a MAC entity of a base station. According to an embodiment of the disclosure, the priority value of each uplink radio resource may be determined using the method described above in relation to FIG. 3 or 4, or another method. For example, the priority value of each SR transmission may be determined as a priority of a logical channel having triggered the SR transmission as described above in relation to FIG. 4, or using another method.

In operation 1210, the MAC entity sets, as prioritization candidates, data or SR transmissions having resources to be sent. According to an embodiment of the disclosure, the specific time period may be a time defined by a wireless communication system, e.g., a frame, a subframe, a slot, or a mini-slot, or a period arbitrarily set by the UE.

In operation 1220, it may be determined whether one of uplink radio resources other than a deprioritized uplink radio resource or SR transmissions other than a deprioritized SR transmission from among uplink radio resources and SR transmissions having resources to be sent is a prioritized uplink radio resource or a prioritized SR transmission. That is, the prioritized uplink radio resource or the prioritized SR transmission may be determined based on priorities of the uplink radio resources and SR transmissions having resources to be sent.

In other words, in operation 1220, the MAC entity may determine whether each uplink radio resource or SR transmission is a prioritized uplink radio resource or a prioritized SR transmission. The MAC entity may determine whether each uplink radio resource or SR transmission is a prioritized uplink radio resource or a prioritized SR transmission, by determining whether another uplink radio resource or a prioritized SR transmission overlapping with the uplink radio resource or the SR transmission on a time axis exists.

In this case, the MAC entity may consider resource overlapping only for uplink radio resources not excluded from the prioritization candidates (i.e., uplink radio resources other than a deprioritized uplink radio resource), and SR transmissions not excluded from the prioritization candidates (i.e., SR transmissions other than a deprioritized SR transmission). Specifically, to determine whether a certain uplink radio resource or SR transmission is a prioritized uplink radio resource or a prioritized SR transmission, the MAC entity may compare priorities of uplink radio resources not excluded from the prioritization candidates and SR transmissions not excluded from the prioritization candidates, from among uplink radio resources overlapping on the time axis in a cell, and SR transmissions overlapping on the time axis in the MAC entity.

Specifically, when the uplink radio resource is a configured grant, and when condition 1) that a configured grant resource having a priority higher than that of and overlapping on the time axis with the uplink radio resource, and not excluded from the prioritization candidates does not exist, condition 2) that a dynamic grant resource having a priority higher than or equal to that of and overlapping on the time axis with the uplink radio resource, and not excluded from the prioritization candidates does not exist, and condition 3) that an SR transmission having a priority higher than that of and overlapping on the time axis with the uplink radio resource, and not excluded from the prioritization candidates does not exist are satisfied, the uplink radio resource may be determined as a prioritized uplink radio resource. Herein, for the configured grant resource, only configured grant resources for a HARQ process in which a configured grant timer is not running may be considered.

When the uplink radio resource is a dynamic grant, and when condition 1) that a configured grant resource having a priority higher than that of and overlapping on the time axis with the uplink radio resource, and not excluded from the prioritization candidates does not exist, condition 2) that a dynamic grant resource having a priority higher than that of and overlapping on the time axis with the uplink radio resource, and not excluded from the prioritization candidates does not exist, and condition 3) that a SR transmission having a priority higher than that of and overlapping on the time axis with the uplink radio resource, and not excluded from the prioritization candidates does not exist are satisfied, the uplink radio resource may be determined as a prioritized uplink radio resource. Herein, for the configured grant resource, only configured grant resources for a HARQ process in which a configured grant timer is not running may be considered.

When an uplink radio resource is excluded from the prioritization candidates, it means that the uplink radio resource is determined as a deprioritized uplink radio resource (deprioritized uplink grant) or is one of configured grant resources using a HARQ process in which a configured grant timer is running. When an SR transmission is excluded from the prioritization candidates, it means that the SR transmission is not determined as a prioritized SR transmission in a process of determining the prioritized SR transmission, or that an SR transmission to be sent does not exist.

In operation 1230, the MAC entity may determine a prioritized uplink radio resource or a prioritized SR transmission and, after the prioritized uplink radio resource or the prioritized SR transmission is determined, an uplink radio resource and SR transmission overlapping on the time axis with the prioritized uplink radio resource or prioritized SR transmission determined in operation 1220 may be excluded from the prioritization candidates.

According to an embodiment of the disclosure, when the prioritized resource is a prioritized uplink radio resource (prioritized uplink grant) to be transmitted in a PUSCH, an uplink radio resource or SR transmission resource overlapping with the prioritized uplink radio resource on the time axis in the same cell or the same BWP may be determined as a deprioritized uplink radio resource or a deprioritized SR transmission.

When the prioritized resource is a prioritized SR transmission to be transmitted in a PUCCH, all uplink radio resources and SR transmission resources overlapping with the prioritized SR transmission on the time axis in the same MAC entity or UE may be determined as deprioritized uplink radio resources or deprioritized SR transmissions. The deprioritized uplink radio resource or deprioritized SR transmission overlapping with the prioritized resource on the time axis may be subsequently excluded from the prioritization candidates.

In operation 1240, the MAC entity may determine whether one of the remaining uplink radio resources and SR transmissions set as the prioritization candidates, i.e., the uplink radio resources and SR transmissions which are not yet determined as deprioritized uplink radio resources or deprioritized SR transmissions, is a prioritized uplink radio resource or a prioritized SR transmission. That is, the prioritized uplink radio resource or the prioritized SR transmission may be determined based on priorities of the uplink radio resources and SR transmissions having resources to be sent. That is, a prioritized uplink radio resource or SR transmission other than the prioritized uplink radio resource or prioritized SR transmission determined in operation 1220 may be determined.

According to an embodiment of the disclosure, as in operation 1230, the MAC entity may repeat the process of excluding, from the prioritization candidates, an uplink radio resource or SR transmission overlapping with the prioritized uplink radio resource or the prioritized SR transmission on the time axis. Thereafter, operation 1240 may be repeated until no more uplink radio resources or SR configuration resources set as the prioritization candidates remain.

When operations 1210 to 1240 of FIG. 12 are applied to the resource configuration shown in FIG. 3, the following prioritization process is performed. The order of selecting resources may vary depending on embodiments, and the result of prioritizing resources may vary accordingly.

The third uplink radio resource 340 is selected. The third uplink radio resource 340 has a highest priority (p=1) from among SR transmission resources not excluded from the prioritization candidates and overlapping on the time axis configured in the MAC entity, and uplink radio resources not excluded from the prioritization candidates and overlapping on the time axis in the cell, and thus is determined as a prioritized uplink radio resource. The first uplink radio resource 320 overlapping with the third uplink radio resource 340 on the time axis of the cell 1 310 is determined as a deprioritized uplink radio resource, and subsequently excluded from the prioritization process (i.e., excluded from the prioritization candidates).

The fourth uplink radio resource 360 is selected. The fourth uplink radio resource 360 has a highest priority from among SR transmission resources not excluded from the prioritization candidates and overlapping on the time axis configured in the MAC entity, and uplink radio resources not excluded from the prioritization candidates and overlapping on the time axis in the cell, and thus is determined as a prioritized uplink radio resource. The sixth uplink radio resource 380 and the fifth uplink radio resource 370 overlapping with the fourth uplink radio resource 360 on the time axis of the cell 2 350 are determined as deprioritized uplink radio resources, and subsequently excluded from the prioritization process (i.e., excluded from the prioritization candidates).

The second uplink radio resource 330, which is the only prioritization candidate at present, is selected. The second uplink radio resource 330 has a highest priority from among SR transmission resources not excluded from the prioritization candidates and overlapping on the time axis configured in the MAC entity, and uplink radio resources not excluded from the prioritization candidates and overlapping on the time axis in the cell, and thus is determined as a prioritized uplink radio resource. The prioritization process is terminated because no more prioritization candidate resources remain.

When operations 1210 to 1240 of FIG. 12 are applied to the resource configuration shown in FIG. 4, the following prioritization process is performed.

The third uplink radio resource 480 is selected. The third uplink radio resource 480 has a highest priority (p=3) from among SR transmission resources not excluded from the prioritization candidates and overlapping on the time axis configured in the MAC entity, and uplink radio resources not excluded from the prioritization candidates and overlapping on the time axis in the cell, and thus is determined as a prioritized uplink radio resource. The second uplink radio resource 470 and the SR transmission 460 overlapping with the third uplink radio resource 480 on the time axis of the cell 1 410 are respectively determined as a deprioritized uplink radio resource and a deprioritized SR transmission, and subsequently excluded from the prioritization process (i.e., excluded from the prioritization candidates).

The first uplink radio resource 420, which is the only prioritization candidate at present, is selected. The first uplink radio resource 420 has a highest priority from among SR transmission resources not excluded from the prioritization candidates and overlapping on the time axis configured in the MAC entity, and uplink radio resources not excluded from the prioritization candidates and overlapping on the time axis in the cell, and thus is determined as a prioritized uplink radio resource. The prioritization process is terminated because no more prioritization candidate resources remain.

From which uplink radio resource or SR transmission operations 1220 to 1240 are to be performed may be determined based on rules preset by the UE. For example, operations 1220 to 1240 may be performed in descending order of priority from a high-priority uplink radio resource or SR transmission.

The methods according to the embodiments described in the claims or the specification of the disclosure may be implemented in hardware, software, or a combination of both.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments described in the claims or the specification of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. Each type of such memory may be provided in a plural number.

In addition, the programs may be stored in an attachable storage device accessible through one or a combination of communication networks such as an internet, an intranet, a local area network (LAN), a wide LAN (WLAN), and a storage area network (SAN). Such a storage device may access, through an external port, a device for implementing the embodiments of the disclosure. An additional storage device on the communication network may also access the device for implementing the embodiments of the disclosure.

In the afore-described embodiments of the disclosure, each element included in the disclosure is expressed in a singular or plural form depending on proposed specific embodiments. However, the singular or plural form is selected properly for a situation assumed for convenience of explanation and does not limit the disclosure, and elements expressed in a plural form may include a single element and an element expressed in a singular form may include a plurality of elements.

While one or more embodiments of the disclosure have been described above, it will be understood that various changes in form and details may be made therein without departing from the scope of the disclosure. Therefore, the scope of the disclosure should not be construed as being limited to the afore-described embodiments and should be defined by the following claims and equivalents thereof. For example, a base station and a UE may operate according to a combination of parts of different embodiments of the disclosure. The embodiments of the disclosure may be applied to other communication systems, and be modified based on the technical aspects of the embodiments.

The invention claimed is:

1. A method performed by a user equipment (UE) in a wireless communication system, the method comprising:

identifying, by a medium access control (MAC) entity, a priority of a first uplink grant that was not excluded from prioritization candidates, wherein the first uplink grant has a highest priority among a plurality of uplink grants that include the first uplink grant and a second uplink grant that overlaps with the first uplink grant in a time domain;

determining, by the MAC entity, the first uplink grant as a first prioritized uplink grant and the second uplink grant as a de-prioritized uplink grant, wherein the de-prioritized uplink grant is excluded from the prioritization candidates, identifying a third uplink grant that was not excluded from the prioritization candidates, wherein the third uplink grant overlaps with the second uplink grant in the time domain; and determining, by the MAC entity, the third uplink grant as a second prioritized uplink grant.

2. The method of claim 1, wherein the first uplink grant is determined as the first prioritized uplink grant when priorities of the second uplink grant and third uplink grant are not higher than the priority of the first uplink grant, wherein the first uplink grant is a dynamic uplink grant or a configured uplink grant, and wherein the second uplink grant is one of the dynamic uplink grant or the configured uplink grant.

3. The method of claim 1, wherein the first uplink grant is a dynamic uplink grant, and wherein the first uplink grant is determined as the first prioritized uplink grant when a priority of a configured uplink grant that overlaps with the first uplink grant in the time domain is not higher than the priority of the first uplink grant.

4. The method of claim 1, wherein the first uplink grant is a configured uplink grant, and wherein the first uplink grant is determined as the first prioritized uplink grant when a priority of another configured uplink grant that overlaps with the first uplink grant in the time domain and a priority of a dynamic grant that overlaps with the first uplink grant in the time domain are not higher than the priority of the first uplink grant.

5. The method of claim 1, wherein the priority of the first uplink grant or a priority of the second uplink grant are identified, by the MAC entity, based on priorities of logical channels multiplexed in a MAC protocol data unit (PDU), or priorities of logical channels being available to be multiplexed in the MAC PDU.

6. A user equipment (UE) performed in a wireless communication system, the UE comprising:

a transceiver; and at least one processor coupled to the transceiver and configured to:

identify, by a medium access control (MAC) entity, a priority of a first uplink grant was not excluded from prioritization candidates, wherein the first uplink grant has a highest priority among a plurality of uplink grants that include the first uplink grant and a second uplink grant that overlaps with the first uplink grant in a time domain, determine, by the MAC entity, the first uplink grant as a prioritized uplink resource and the second uplink grant as a de-prioritized uplink grant, wherein the de-prioritized uplink grant is excluded from the prioritization candidate, identify a third uplink grant that was not excluded from the prioritization candidates, wherein the third uplink grant overlaps with the second uplink grant in the time domain, and determine, by the MAC entity, the third uplink grant as a second prioritized uplink grant.

7. The UE of claim 6, wherein the first uplink grant is determined as the first prioritized uplink grant when priorities of the second uplink grant and third uplink grant are not higher than the priority of the first uplink grant, wherein the first uplink grant is a dynamic uplink grant or a configured uplink grant, and wherein the second uplink grant is one of the dynamic uplink grant or the configured uplink grant.

8. The UE of claim 6, wherein the first uplink grant is a dynamic uplink grant, and wherein the first uplink grant is determined as the first prioritized uplink grant when a priority of a configured uplink grant that overlaps with the first uplink grant in the time domain is not higher than the priority of the first uplink grant.

9. The UE of claim 6, wherein the first uplink grant is a configured uplink grant, and wherein the first uplink grant is determined as the first prioritized uplink grant when a priority of another configured uplink grant that overlaps with the first uplink grant in the time domain and a priority of a dynamic grant that overlaps with the first uplink grant in the time domain are not higher than the priority of the first uplink grant.

10. The UE of claim 6, wherein the priority of the first uplink grant or a priority of the second uplink grant is identified, by the MAC entity, based priorities of logical channels multiplexed in a MAC protocol data unit (PDU) or priorities of logical channels being available to be multiplexed in the MAC PDU.

* * * * *